United States Patent
Lee et al.

(10) Patent No.: US 12,530,160 B2
(45) Date of Patent: Jan. 20, 2026

(54) DISPLAY APPARATUS, ELECTRONIC DEVICE, AND OPERATING METHODS THEREOF

(71) Applicant: SAMSUNG ELECTRONICS CO., LTD., Suwon-si (KR)

(72) Inventors: Jongin Lee, Suwon-si (KR); Sehyun Kim, Suwon-si (KR); Minjoo Kim, Suwon-si (KR); Geumrae Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 18/612,784

(22) Filed: Mar. 21, 2024

(65) Prior Publication Data

US 2024/0319945 A1    Sep. 26, 2024

Related U.S. Application Data

(63) Continuation of application No. PCT/KR2024/002802, filed on Mar. 5, 2024.

(30) Foreign Application Priority Data

Mar. 21, 2023 (KR) .................. 10-2023-0036918

(51) Int. Cl.
*G06F 3/14* (2006.01)
*G06T 7/00* (2017.01)
*H04L 67/01* (2022.01)

(52) U.S. Cl.
CPC .............. *G06F 3/14* (2013.01); *G06T 7/0002* (2013.01); *H04L 67/01* (2022.05)

(58) Field of Classification Search
CPC ......... G06F 3/14; G06T 7/0002; H04L 67/01; H04N 21/4122; H04N 21/43615; H04N 21/44008
See application file for complete search history.

(56) References Cited

U.S. PATENT DOCUMENTS 7,072,662 B2    7/2006   Naruse
8,302,155 B2   10/2012   Han et al.
(Continued)

FOREIGN PATENT DOCUMENTS

CN    111459355 A    7/2020
EP    3 771 219 A1   1/2021
(Continued)

OTHER PUBLICATIONS

International Search Report (PCT/ISA/210) and Written Opinion (PCT/ISA/237) issued Jun. 10, 2024 by the International Searching Authority in the International Patent Application No. PCT/KR2024/002802.
(Continued)

*Primary Examiner* — Dmitriy Bolotin
(74) *Attorney, Agent, or Firm* — Sughrue Mion, PLLC

(57) ABSTRACT

A display apparatus, including: a display; a communicator; at least one processor; and a memory configured to store one or more instructions which, when executed by the at least one processor, cause the display apparatus to: transmit, to an electronic device, a request for remote connection for receiving content; receive, from the electronic device, information about a protocol determined based on a type of the content; arrange a pipeline configured to process the content, based on the information about the protocol; and output, using the pipeline, the content received from the electronic device according to the protocol.

20 Claims, 18 Drawing Sheets

(56) References Cited

U.S. PATENT DOCUMENTS

| | | | |
|---|---|---|---|
| 9,113,188 B2* | 8/2015 | Moon | H04N 21/8358 |
| 9,930,094 B2 | 3/2018 | Ahn et al. | |
| 10,567,457 B1 | 2/2020 | Thomas et al. | |
| 12,346,624 B2* | 7/2025 | Kim | H04L 47/25 |
| 2002/0015042 A1* | 2/2002 | Robotham | G06F 3/1454 |
| | | | 345/581 |
| 2011/0138429 A1* | 6/2011 | Schade | H04N 7/17318 |
| | | | 725/98 |
| 2013/0047178 A1* | 2/2013 | Moon | H04N 21/4722 |
| | | | 725/31 |
| 2013/0047180 A1* | 2/2013 | Moon | H04N 21/4722 |
| | | | 725/114 |
| 2013/0054826 A1* | 2/2013 | Hong | H04W 4/14 |
| | | | 709/231 |
| 2013/0067109 A1 | 3/2013 | Dong et al. | |
| 2015/0063451 A1 | 3/2015 | Zhu et al. | |
| 2015/0082336 A1* | 3/2015 | Moon | H04N 21/482 |
| | | | 725/110 |
| 2015/0121416 A1* | 4/2015 | Moon | H04N 21/4788 |
| | | | 725/110 |
| 2015/0156532 A1* | 6/2015 | Moon | H04N 21/64322 |
| | | | 725/133 |
| 2017/0085938 A1* | 3/2017 | Yeom | H04N 21/431 |
| 2017/0171618 A1* | 6/2017 | Fryer | H04N 21/6125 |
| 2022/0413670 A1 | 12/2022 | Liu | |
| 2023/0176705 A1* | 6/2023 | Kwon | G06F 3/038 |
| | | | 715/740 |
| 2023/0328308 A1* | 10/2023 | Marciano | H04N 21/44008 |
| 2024/0089526 A1* | 3/2024 | Yang | H04N 21/431 |
| 2024/0311292 A1* | 9/2024 | Uchida | G06F 12/0246 |
| 2024/0319945 A1* | 9/2024 | Lee | G06F 3/14 |
| 2025/0104760 A1* | 3/2025 | Sharma | G11C 11/4085 |
| 2025/0259591 A1* | 8/2025 | Seo | G09G 3/3291 |

FOREIGN PATENT DOCUMENTS

| | | |
|---|---|---|
| JP | 2007-189745 A | 7/2007 |
| JP | 2010-206480 A | 9/2010 |
| KR | 10-2013-0014763 A | 2/2013 |
| KR | 10-2013-0109450 A | 10/2013 |
| KR | 10-2016-0031724 A | 3/2016 |
| KR | 10-2016-0042739 A | 4/2016 |
| KR | 10-2016-0052688 A | 5/2016 |
| KR | 10-1624645 B1 | 5/2016 |
| KR | 10-2017-0122571 A | 11/2017 |
| KR | 10-2122560 B1 | 6/2020 |
| WO | 2010/047740 A1 | 4/2010 |

OTHER PUBLICATIONS

Communication issued Nov. 18, 2025 by the European Patent Office in European Patent Application No. 24775093.8.

\* cited by examiner

DISPLAY APPARATUS, ELECTRONIC DEVICE, AND OPERATING METHODS THEREOF

CROSS-REFERENCE TO RELATED APPLICATIONS

This application is a continuation of International Application No. PCT/2024/002802, filed on Mar. 5, 2024, which claims priority to Korean Patent Application No. 10-2023-0036918, filed on Mar. 21, 2023, in the Korean Patent Office, the disclosures of which are incorporated by reference herein in their entireties.

BACKGROUND

1. Field

The disclosure relates to a display apparatus, an electronic device, and operating methods thereof, and more particularly, to a display apparatus remotely connected to an electronic device and configured to receive an output screen of the electronic device, and the electronic device remotely connected to the display apparatus and configured to share the output screen.

2. Description of Related Art

Remote connection services may allow a source device sharing a screen to be wirelessly connected to a sink device receiving the screen. In some remote connection services, the sink device may be connected to the source device, and may receive content from the source device and output the content. Also, the sink device may control a screen received from the source device, through a user input to a manipulation device of the sink device.

When the content provided from the source device includes a large volume of video content, a latency or delay time may occur between the source device and the sink device when playing the content. Accordingly, for transmitting the video content, a streaming protocol may be used. The streaming protocol may split video data into packets of reduced sizes and transmit the packets at predetermined intervals, and may thus decrease a delay time and a loading time of the video data. Also, the streaming protocol may select a data compression method using a media codec.

However, the data compression method using the media codec may be optimized for video content such as game content, and when text-oriented document content is processed through the media codec, the text visibility may be reduced.

SUMMARY

In accordance with an aspect of the disclosure, a display apparatus includes: a display; a communicator; at least one processor; and a memory configured to store one or more instructions which, when executed by the at least one processor, cause the display apparatus to: transmit, to an electronic device, a request for remote connection for receiving content; receive, from the electronic device, information about a protocol determined based on a type of the content; arrange a pipeline configured to process the content, based on the information about the protocol; and output, using the pipeline, the content received from the electronic device according to the protocol.

In accordance with an aspect of the disclosure, an electronic device includes: a communicator; at least one processor; and a memory configured to store one or more instructions which, when executed by the at least one processor, cause the electronic device to: receive a request for remote connection from a display apparatus; determine a protocol based on a type of content to be transmitted to the display apparatus; transmit information about the determined protocol to the display apparatus; and based on receiving a request for the content from the display apparatus, transmit the content to the display apparatus according to the protocol.

In accordance with an aspect of the disclosure, an operating method of a display apparatus includes: transmitting, to an electronic device, a request for remote connection for receiving content; receiving, from the electronic device, information about a protocol determined based on a type of the content; arranging a pipeline for processing the content, based on the information about the protocol; and outputting, using the pipeline, the content received from the electronic device according to the protocol.

BRIEF DESCRIPTION OF THE DRAWINGS

The above and other aspects, features, and advantages of certain embodiment of the present disclosure will be more apparent from the following description taken in conjunction with the accompanying drawings, in which.

DETAILED DESCRIPTION

Figure 1:
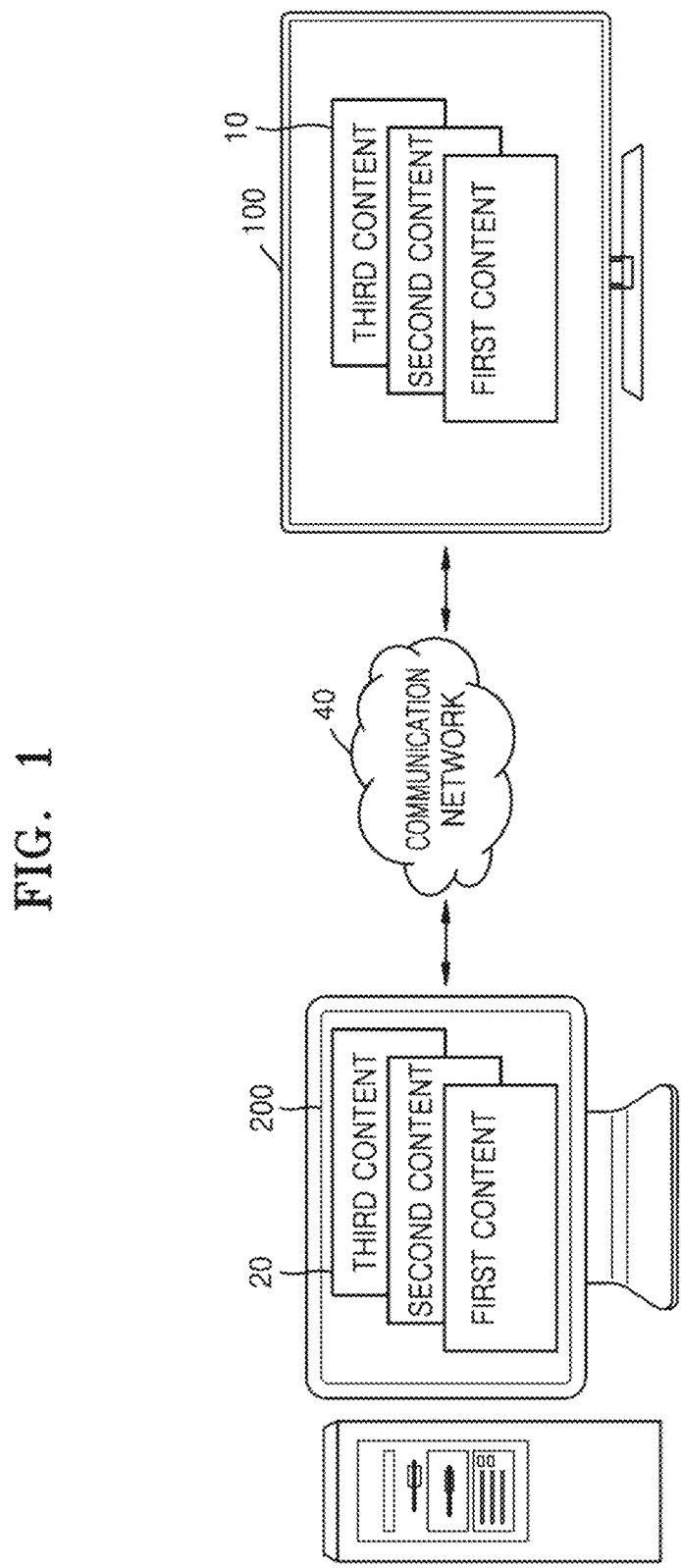
FIG. 1 is a conceptual diagram for describing a remote connection service between a display apparatus and an electronic device, according to an embodiment of the disclosure.

Throughout the disclosure, the expression "at least one of a, b or c" may indicate "a," "b," "c," "a and b," "a and c," "b and c," "all of a, b, and c," or variations thereof.

Some terms used herein are briefly described below.

The terms used in the disclosure are general terms used in consideration of the functions in the disclosure, which, however, may be changed according to an intention of a technician in the art, a precedent, the advent of new technologies, or the like. Also, in particular cases, there may be terms which are arbitrarily selected, and in this case, the meanings of the terms are described in detail in the corresponding parts of the description of the disclosure. Therefore, the terms used in the disclosure should be defined based on the meanings of the terms and the content throughout the disclosure, rather than simply based on the titles of the terms.

Throughout the disclosure, when a part "includes" or "comprises" an element, the part may further include other elements, rather than excluding the other elements, unless there is a particular description contrary thereto. Also, terms such as "unit," "module," etc., described in the disclosure indicate a unit that processes or performs at least one function or operation, and the unit may be embodied in a hardware manner, a software manner, or a combination of the hardware manner and the software manner.

Hereinafter, an embodiment of the disclosure is described in detail with reference to the accompanying drawings, so that the embodiment of the disclosure may be more easily implemented by one of ordinary skill in the art. However, the disclosure may have different forms and should not be construed as being limited to the embodiment of the disclosure described herein. Also, in the drawings, parts not related to descriptions are omitted for the clear description of the disclosure, and throughout the specification, like reference numerals are used for like elements.

According to an embodiment of the disclosure, the term "user" may denote a person controlling a system, a function, or an operation and may include at least one of a manufacturer, a manager, an installation technician, and an end user.

According to an embodiment of the disclosure, when a function is described as being processed by a processor, the function may be processed by one processor or a combination of processors. For example, when functions A, B, and C are described as being processed by a processor, this may encompass a scenario in which a first processor performs functions A and B, and a second processor performs function C, and may also encompass a scenario in which the first processor performs a portion of function A, and the second processor performs a remaining portion of function A, and also functions B and C. In an embodiment, the processor may include circuitry such as at least one from among a central processing unit (CPU), a microprocessor unit (MPU), an application processor (AP), a communication processor (CP), a system-on-chip (SoC), and an integrated circuit (IC)."

Hereinafter, the disclosure is described in detail with reference to the accompanying drawings.

FIG. 1 is a conceptual diagram for describing a remote connection service between a display apparatus and an electronic device, according to an embodiment of the disclosure.

Referring to FIG. 1, the system may include a display apparatus 100, an electronic device 200, and a communication network 40.

The system according to an embodiment of the disclosure may provide a remote connection service. The display apparatus 100 and the electronic device 200 may be configured to provide the remote connection service. The remote connection service according to an embodiment of the disclosure may be configured to remotely connect a source device sharing a screen to, or with, a sink device receiving the shared screen. For example, in the remote connection service, the source device and the sink device may be wirelessly connected to each other, the source device may transmit currently-executed content to the sink device, and the sink device may output the content received from the source device. Also, in the remote connection service, the sink device may control the remotely connected source device through, or based on, a user input to a manipulation device (for example, a remote controller, a mouse, a keyboard, etc.) of the sink device.

According to an embodiment of the disclosure, the source device configured to provide the remote connection service may be the electronic device 200, and the sink device may be the display apparatus 100. In this case, the electronic device 200 and the display apparatus 100 may be remotely connected to each other through the communication network 40. However, the disclosure is not limited thereto, and the source device may be the display apparatus 100, and the sink device may be the electronic device 200.

The electronic device 200 may be connected to the display apparatus 100 through the communication network 40.

The electronic device 200 may be configured to provide various types of content. When the electronic device 200 receives a remote connection request from the display apparatus 100, the electronic device 200 may, in response to the request, provide content displayed on the electronic device 200 to the display apparatus 100 through the communication network 40. According to an embodiment of the disclosure, when an element or operation is described as occurring "in response to" a condition, this may mean that the element or operation occurs "based on" an occurrence of the condition. Various types of content may include, for example, video content such as game content, movie content, and document content output through a document-editing application, etc. For example, the electronic device 200 may edit, store, and read a document by executing the document-editing application, thereby handling a screen output through the document-editing application as document content.

Also, for example, the electronic device 200 may provide various types of content through a web browser. For example, through the web browser, the electronic device 200 may provide a search result screen of a search engine, provide a playback screen of video on demand (VOD), or provide article-type content such as news, etc. In this case, the electronic device 200 may treat the search result screen corresponding to a result of a search through the search engine of the web browser and the article-type content such as news, etc. as the document content and may treat the VOD played through the web browser as the video content.

As shown in FIG. 1, the electronic device 200 may provide, for example, content 20 of various types, including first content, second content, and third content. For example, the electronic device 200 may provide each of the first content, the second content, and the third content as a single-view screen, as illustrated in FIG. 1. However, the electronic device 200 is not limited thereto and may provide the content 20 of various types as a multi-view screen, for example as a split screen.

The electronic device 200 may include at least one of a desktop personal computer (PC), a smartphone, a tablet PC, a mobile phone, a video calling phone, an electronic book (e-book) reader, a laptop PC, a netbook computer, a digital camera, a personal digital assistant (PDA), a portable multimedia player (PMP), a camcorder, a navigation device, a wearable device, and a smart watch.

The display apparatus 100 may display various types of content and may be remotely connected to the electronic device 200 through the communication network 40. The display apparatus 100 may receive content from the electronic device 200 remotely connected thereto and may output the received content through a display.

For example, the display apparatus 100 may receive and display, on the display, video content, such as game content, movie content, VOD content, etc. For example, the display apparatus 100 may receive from the electronic device 200, and display on the display, a screen displayed by a document-editing application. Also, for example, the display apparatus 100 may receive from the electronic device 200, and display on the display, a search result screen of a search engine through a web browser and article-type content such as news, etc.

As shown in FIG. 1, the display apparatus 100 may output content 10 of various types, including first content, second content, and third content. For example, the display apparatus 100 may provide each of the first content, the second content, and the third content as a single-view screen, as illustrated in FIG. 1. However, the display apparatus 100 is not limited thereto and may provide the content 10 of various types as a multi-view screen.

The display apparatus 100 may include various types of electronic devices capable of receiving and outputting content, such as a network television (TV), a smart TV, an Internet TV, a web TV, an Internet protocol TV (IPTV), a PC, etc. The display apparatus 100 may be referred to as a display device, because the display apparatus 100 may receive and display content. Also, the display apparatus 100 may be referred to as a content-receiving device, a sink device, an electronic device, a computing device, etc.

According to an embodiment of the disclosure, the electronic device 200 and the display apparatus 100 may exchange various types of content through the remote connection service. Various types of content may be transmitted through a transmission protocol determined by negotiation between the electronic device 200 and the display apparatus 100. For example, the determined protocol may enable safe and efficient transmission of data between the electronic device 200 and the display apparatus 100. For example, the electronic device 200 may transmit, to the display apparatus 100, video content being output in the electronic device 200 through a video playback application, through a first communication protocol determined through negotiation with the display apparatus 100, and the display apparatus 100 may process and output the video content. Also, for example, the electronic device 200 may transmit, to the display apparatus 100, document content being output in the electronic device 200 through a document-editing application, through a second communication protocol determined through negotiation with the display apparatus 100, and the display apparatus 100 may process and output the document content.

The video content may generally have a large volume of data and may use a high bandwidth, and thus, transmission of the video content may require a streaming protocol. The streaming protocol may compress video data using similarity between frames included in the video data through a data compression process, may split the video data into packets having reduced sizes, and may transmit the packets at predetermined time intervals, and thus, may reduce the latency and load time of the video data. Also, the video content may be frequently streamed in real time, and thus, it may be important to reduce or minimize the latency in a process of transmitting the video content. For example, the streaming protocol may include web real-time communication (WebRTC), HTTP live streaming (HLS), MPEG-DASH, etc.

In contrast, the document content may have a relatively smaller volume of data than the video content, and thus, the document content may be rapidly loaded without using the streaming protocol. Also, when the document content is transmitted through the streaming protocol, losses may occur due to a compressing and decompressing process of encoding and decoding text data, and such losses may distort content of the document or deteriorate the visibility of the text data. It may be important to maximize the visibility of the text data in a process of transmitting the document content, and thus, there is a need to use a different protocol, which is not the streaming protocol. For example, for the transmission of the document content, a remote desktop protocol for remote connection may be used. For example, the remote desktop protocol may include protocols such as a remote desktop protocol (RDP), virtual network computing (VNC), secure shell (SSH), etc. According to an embodiment of the disclosure, the remote desktop protocol may be used for the transmission of the document content, but the disclosure is not limited thereto. For example, various document transmission-dedicated protocols for obtaining the text visibility may be used.

According to an embodiment of the disclosure may provide a method by which, when content to be transmitted is video content, the content may be transmitted through a streaming protocol, and when content to be transmitted is document content, the content may be transmitted through a remote desktop protocol. Accordingly, when the video content is transmitted, a delay time may be reduced or minimized, and when the document content is transmitted, loss of text data may be reduced or minimized and visibility of the text data may be increased or maximized.

The display apparatus 100 according to an embodiment of the disclosure may transmit a request for remote connection to the electronic device 200. When the electronic device 200 receives the request for remote connection from the display apparatus 100, the electronic device 200 may determine a protocol used for transmission and reception of content, based on a type of content to be transmitted. In response to the reception of the request for remote connection from the display apparatus 100, the electronic device 200 may transmit information about a selected protocol to the display apparatus 100. According to an embodiment of the disclosure, the information about the protocol may be, or may include, at least one of information with respect to the protocol, information regarding the protocol, and information indicating the protocol. For example, information about the protocol may include information with respect to or regarding identification of the protocol. The display apparatus 100 according to an embodiment of the disclosure may receive document content through a remote desktop protocol and may process the document content through a pipeline to improve text visibility of the document content.

According to an embodiment of the disclosure, the remote desktop protocol may transmit graphics data in the form of bitmap data without compressing the document content. For example, the remote desktop protocol may transmit and receive text data without a compression and decompression process of encoding and decoding the text data, and thus, a loss or content distortion, which may occur in a data compression and decompression process, may be reduced or minimized.

According to an embodiment of the disclosure, video content may be referred to as content of a first type and the streaming protocol may be referred to as a first protocol. Also, document content may be referred to as content of a second type and the remote desktop protocol may be referred to as a second protocol.

The display apparatus 100 and the electronic device 200 according to an embodiment of the disclosure may provide a remote connection service configured to determine a suitable transmission protocol according to a type of content, and to transmit and receive the content according to the determined protocol. For example, the display apparatus 100 and the electronic device 200 may determine a transmission protocol suitable for transmitting and receiving the video content and may determine a transmission protocol suitable for transmitting and receiving the document content, and thus, may reduce or minimize the latency of the video content and increase or maximize the visibility of the document content.

According to an embodiment of the disclosure, while remote connection is being continued, or is maintained, the display apparatus 100 may periodically determine whether the determined protocol is suitable, based on output screen of the content. As an example, when a user uses the remote connection service, the user may execute the video content in the electronic device 200, and then, may end the video content and execute the document content. In this case, the display apparatus 100 may output the video content by receiving the video content through the streaming protocol, and then, may output the document content by receiving the document content through the streaming protocol. When the display apparatus 100 outputs the document content through the streaming protocol, visibility of text data of a content output screen may deteriorate. Thus, the display apparatus 100 may periodically determine whether a resolution of text data of a current output screen is low, and may change or maintain a protocol based on this determination.

As another example, when a user uses the remote connection service, the user may execute the document content and may end execution of the document content to execute the video content, in the electronic device 200. In this case, the display apparatus 100 may output the document content by receiving the document content through the remote desktop protocol, and then, may output the video content by receiving the video content through the remote desktop protocol. When the display apparatus 100 outputs the video content through the remote desktop protocol, a delay time of the video content may be increased. Thus, the display apparatus 100 may periodically determine whether the amount of change of an image of a current output screen is large, and may change or maintain a protocol based on this determination.

As yet another example, the display apparatus 100 may provide a user interface for asking whether to change the protocol and may change the protocol according to a user response. For example, the display apparatus 100 may maintain a current protocol when there is no user response. For example, the display apparatus 100 may not provide the user interface and may automatically change the protocol.

The display apparatus 100 according to an embodiment of the disclosure may determine, by determining a state of the current output screen, whether content is received through a suitable protocol. When it is determined that the content is currently received through a non-suitable protocol, the display apparatus 100 may request the electronic device 200 to change the protocol to a suitable protocol. Thus, the display apparatus 100 may maintain to reduce or minimize the latency of the video content and maintain to increase or maximize the text visibility of the document content, while the remote connection is being continued.

Figure 2:
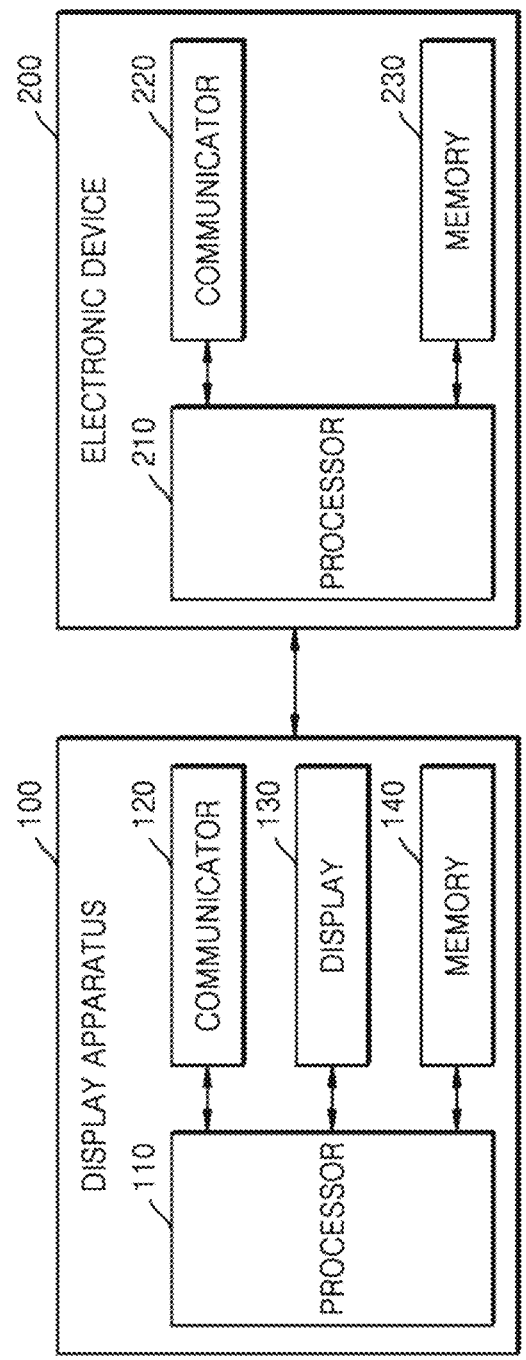
FIG. 2 is a block diagram showing schematic structures of a display apparatus and an electronic device, according to an embodiment of the disclosure.

FIG. 2 is a block diagram showing schematic structures of a display apparatus and an electronic device, according to an embodiment of the disclosure.

Referring to FIG. 2, the display apparatus 100 may include a processor 110, a communicator 120, a display 130, and a memory 140.

The communicator 120 may receive data from the electronic device 200 according to a wireless communication protocol, according to control by the processor 110. For example, the communicator 120 may receive video content through a first protocol or document content through a second protocol from the electronic device 200, according to control by the processor 110.

The communicator 120 may use short-range communication, for example, Bluetooth, Bluetooth low energy (BLE), near-field communication, a wide local area network (WLAN) (or wireless fidelity (Wifi)), Zigbee, infrared data association (IrDA) communication, Wifi direct (WFD), ultra wideband (UWB), Ant+ communication, etc.

The communicator 120 according to an embodiment of the disclosure may transmit a request for remote connection for receiving content, to the electronic device 200, according to control by the processor 110.

The communicator 120 according to an embodiment of the disclosure may receive information about a protocol determined based on a type of content, from the electronic device 200, according to control by the processor 110.

The communicator 120 according to an embodiment of the disclosure may transmit a request for a change of the protocol to the electronic device 200, based on a determination about the change of the protocol, according to control by the processor 110.

The communicator 120 according to an embodiment of the disclosure may receive content of a first type through the first protocol, based on the information about the protocol received from the electronic device 200 indicating the first protocol, according to control by the processor 110.

The communicator 120 according to an embodiment of the disclosure may receive content of a second type through the second protocol, based on the information about the protocol received from the electronic device 200 indicating the second protocol, which is different from the first protocol, according to control by the processor 110.

The communicator 120 according to an embodiment of the disclosure may receive, from the electronic device 200, the information about the protocol corresponding to a type of a piece of content occupying the largest area on an output screen of the electronic device 200 from among a plurality of pieces of content, according to control by the processor 110.

The display 130 may output, on a screen, content received from a broadcasting station, received from an external device, such as an external server or an external storage medium, or provided by various applications, for example, an over-the-top (OTT) service provider or a metaverse content provider. The display 130 may provide a graphics user interface (GUI) associated with an application.

The display 130 according to an embodiment of the disclosure may output the content received from the electronic device 200, according to control by the processor 110.

The display 130 according to an embodiment of the disclosure may output the video content or the document content according to control by the processor 110.

The memory 140 may store a program associated with an operation of the display apparatus 100 and various types of data generated during an operation of the display apparatus 100. The memory 1140 may store at least one instruction. Also, the memory 1140 may store at least one instruction executed by the processor 110. Also, the memory 1140 may store at least one program executed by the processor 110. Also, the memory 140 may store an application for providing a predetermined service.

For example, the memory 140 may include at least one type of storage medium from among a flash memory type, a hard disk type, a multimedia card micro type, a card type memory (e.g., an SD or an XD memory), random-access memory (RAM), static RAM (SRAM), read-only memory (ROM), electrically erasable programmable ROM (EEPROM), programmable ROM (PROM), a magnetic memory, a magnetic disk, and an optical disk.

The processor 110 may control general operations of the display apparatus 100. For example, the processor 110 may execute one or more instructions stored in the memory 140 to perform a function of the display apparatus 100 according to an embodiment of the disclosure.

According to an embodiment of the disclosure, the processor 110 may store one or more instructions in an internal memory provided in the processor 110 and may execute the one or more instructions stored in the internal memory provided in the processor 110 to control the execution of the operations of the display apparatus. For example, the processor 110 may execute the one or more instructions or programs stored in the internal memory of the processor 110 or the memory 140, to perform a predetermined operation.

According to an embodiment of the disclosure, the processor 110 may execute one or more instructions of the programs stored in the memory 140 to transmit a request for remote connection for receiving content to the electronic device 200. According to an embodiment of the disclosure, the processor 110 may receive, from the electronic device 200, the information about the protocol determined based on the type of the content. According to an embodiment of the disclosure, the processor 110 may arrange a pipeline for processing the content, based on information about the protocol. According to an embodiment of the disclosure, the processor 110 may output the content received from the electronic device 200 through the protocol, using the pipeline. According to an embodiment of the disclosure, when content is described as being transmitted or received "through" a protocol, this may mean that the content is transmitted or received according to the protocol, or in accordance with the protocol.

According to an embodiment of the disclosure, the processor 110 may execute the one or more instructions of the programs stored in the memory 140 to determine whether to change the protocol, based on the output screen of the content. According to an embodiment of the disclosure, the processor 110 may transmit a request for changing the protocol to the electronic device 200, when it is determined to change the protocol.

According to an embodiment of the disclosure, the processor 110 may execute the one or more instructions of the programs stored in the memory 140 to receive the content of the first type through the first protocol, based on the information about the protocol received from the electronic device 200 indicating the first protocol. According to an embodiment of the disclosure, the processor 110 may receive the content of the second type through the second protocol, based on the information about the protocol indicating the second protocol, which is different from the first protocol.

The content of the first type may include the video content, and the content of the second type may include the document content.

According to an embodiment of the disclosure, the processor 110 may execute the one or more instructions of the programs stored in the memory 140 to arrange the pipeline including a decoder, based on the reception of the information about the first protocol from the electronic device 200. According to an embodiment of the disclosure, the processor 110 may arrange the pipeline not including the decoder, based on the reception of the information about the second protocol from the electronic device 200.

According to an embodiment of the disclosure, the processor 110 may execute the one or more instructions of the programs stored in the memory 140 to receive, from the electronic device 200, the information about the protocol corresponding to the type of the piece of content occupying the largest area of the output screen of the electronic device 200 from among the plurality of pieces of content.

According to an embodiment of the disclosure, the processor 110 may determine, according to a first process, a state of an output screen of the content received through the first protocol.

According to an embodiment of the disclosure, the processor 110 may determine, according to a second process, which is different from the first process, a state of an output screen of the content received through the second protocol.

According to an embodiment of the disclosure, the processor 110 may determine a text resolution of the content received from the electronic device 200 through the first protocol. According to an embodiment of the disclosure, based on determining that the text resolution is less than a threshold value, the processor 110 may transmit, to the electronic device 200, a request for a change to the second protocol.

According to an embodiment of the disclosure, the processor 110 may determine the amount of change of an image of the content received from the electronic device 200 through the second protocol. According to an embodiment of the disclosure, based on determining that the amount of change of the image is greater than a threshold value, the processor 110 may transmit, to the electronic device 200, a request for a change to the first protocol.

According to an embodiment of the disclosure, based on determining that the determined protocol of the display apparatus 100 is non-suitable, the processor 110 may provide a user interface for asking whether to change the protocol.

According to an embodiment of the disclosure, the processor 110 may process, using the pipeline, image data received from the electronic device 200 through a remote desktop protocol.

According to an embodiment of the disclosure, the processor 110 may perform playback, using the pipeline, of video data received from the electronic device 200 through a streaming protocol.

The memory 140 of the display apparatus 100 according to an embodiment of the disclosure may further include a remote desktop client module 102 configured to process the image data corresponding to the document content and a streaming processing module 101 configured to process the video data corresponding to the video content. An example of this aspect is described in detail below with reference to FIG. 7.

The electronic device 200 may include a processor 210, a communicator 220, and a memory 230.

The communicator 220 may use short-range communication, for example, Bluetooth, BLE, near-field communication, a WLAN (or Wifi), Zigbee, IrDA communication, WFD, UWB, Ant+ communication, etc. The communicator 220 may communicate with an external device through remote communication, for example, a legacy cellular network, a fifth generation (5G) network, a next-generation communication network, the Internet, a computer network (e.g., a LAN or a WAN), or the like.

The communicator 220 according to an embodiment of the disclosure may receive the request for remote connection from the display apparatus 100, according to control by the processor 210.

The communicator 220 according to an embodiment of the disclosure may transmit, to the display apparatus 100, the information about the determined protocol, according to control by the processor 210.

In response to receiving a request for the content 10 from the display apparatus 100, the communicator 220 according to an embodiment of the disclosure may transmit the content to the display apparatus 100 through the protocol, according to control by the processor 210.

In response to identifying that the content is the first type, the communicator 220 according to an embodiment of the disclosure may transmit the information about the first protocol to the display apparatus 100, according to control by the processor 210. For example, the communicator 220 may transmit the video content to the display apparatus 100 through the first protocol, according to control by the processor 210.

In response to identifying that the content is the second type, the communicator 220 according to an embodiment of the disclosure may transmit the information about the second protocol, which is different from the first protocol, to the display apparats 100, according to control by the processor 210. For example, the communicator 220 may transmit the document content through the second protocol, according to control by the processor 210.

The memory 230 may store programs associated with an operation of the electronic device 200 and various data generated during the operation of the electronic device 200. The memory 230 may store various information, data, instructions, programs, etc. required for the operation of the electronic device 200. The memory 230 may include at least one of a volatile memory or a non-volatile memory or a combination thereof. The memory 230 may include a storage medium of at least one of a flash memory-type, a hard disk-type, a multimedia card micro-type, a card-type memory (for example, SD or XD memory), RAM, SRAM, ROM, EEPROM, PROM, a magnetic memory, a magnetic disk, or an optical disk.

The memory 230 may store at least one instruction. Also, the memory 230 may store at least one instruction executed by the processor 210. Also, the memory 230 may store at least one program executed by the processor 210. Also, the memory 230 may store an application for providing a predetermined service.

The processor 210 may control general operations of the electronic device 200. For example, the processor 210 may execute one or more instructions stored in the memory 230 to perform a function of the electronic device 200 according to an embodiment of the disclosure.

According to an embodiment of the disclosure, the processor 210 may execute the one or more instructions stored in the memory 230 to receive a request for remote connection from the display apparatus 100. According to an embodiment of the disclosure, the processor 210 may determine a protocol, based on a type of content to be transmitted to the display apparatus 100. According to an embodiment of the disclosure, the processor 210 may transmit information about the determined protocol to the display apparatus 100. According to an embodiment of the disclosure, the processor 210 may transmit the content to the display apparatus 100 through the protocol, in response to receiving a request for the content from the display apparatus 100.

According to an embodiment of the disclosure, the processor 210 may execute the one or more instructions stored in the memory 230 to perform an operation of changing a protocol, in response to receiving a request for changing the protocol from the display apparatus 100.

According to an embodiment of the disclosure, the processor 210 may execute the one or more instructions stored in the memory 230 to transmit information about the first protocol to the display apparatus 100, in response to identifying that the content is the first type.

According to an embodiment of the disclosure, the processor 210 may execute the one or more instructions stored in the memory 230 to transmit information about the second protocol, which is different from the first protocol, to the display apparatus 100, in response to identifying that the content is the second type.

According to an embodiment of the disclosure, the processor 210 may execute the one or more instructions stored in the memory 230 to identify a piece of content occupying the largest area on an output screen of the electronic device 200 from among a plurality of pieces of content to be transmitted.

According to an embodiment of the disclosure, the processor 210 may execute the one or more instructions stored in the memory 230 to transmit the information about the protocol corresponding to a type of the identified piece of the content.

The memory 230 of the electronic device 200 according to an embodiment of the disclosure may further include a content-type determination module 201 configured to determine a type of content, a remote desktop server module 203 configured to process the image data corresponding to the document content, and a streaming provision module 202 configured to process the video data corresponding to the video content. An example of this aspect is described in detail below with reference to FIG. 7.

Figure 3:
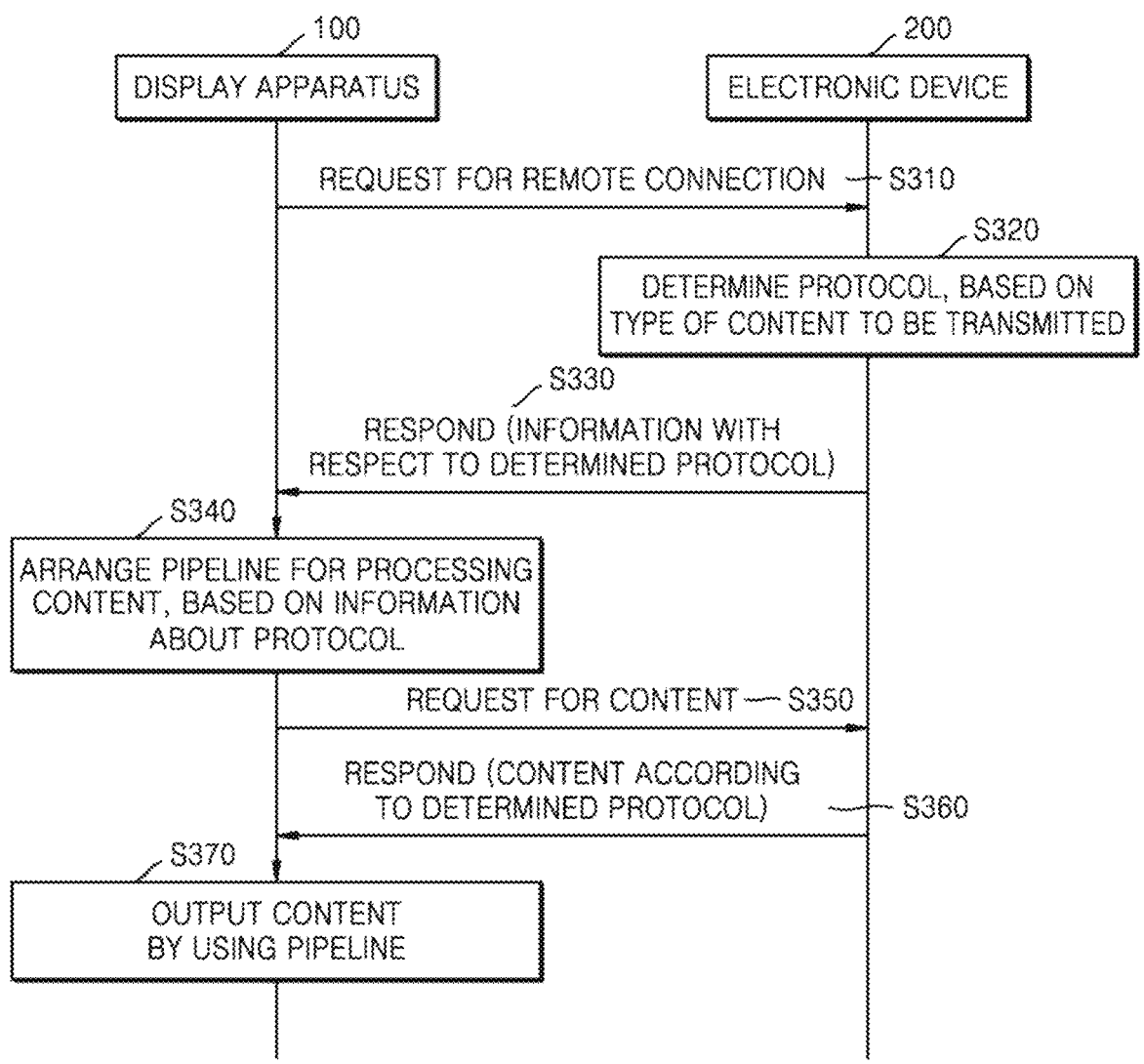
FIG. 3 is an example of a flowchart showing operations of a display apparatus and an electronic device, according to an embodiment of the disclosure.

FIG. 3 is an example of a flowchart showing operations of a display apparatus and an electronic device, according to an embodiment of the disclosure.

Referring to FIG. 3, in operation S310, the display apparatus 100 according to an embodiment of the disclosure may transmit a request for remote connection to the electronic device 200.

In operation S320, the electronic device 200 according to an embodiment of the disclosure may determine a protocol based on a type of content to be transmitted.

For example, when the electronic device 200 receives the request for remote connection from the display apparatus 100, the electronic device 200 may determine a transmission protocol for data transmission, based on the type of the content to be transmitted.

For example, the electronic device 200 may identify the type of the content to be transmitted to the display apparatus 100. For example, the content may include various types of video content, such as game content, movie content, VOD of a web browser, etc., and various types of document content, such as an execution screen of a document-editing application, a search result screen of a search engine through a web browser, news content through the web browser, etc.

For example, the electronic device 200 may classify types of content based on features of the content and may determine, according to the types of the content, the transmission protocol to be used to transmit the content. For example, the electronic device 200 may store metadata including an attribute, type, genre, or the like of an application. For example, the electronic device 200 may identify the metadata defined in the application to identify whether the application provides video content or document content.

For example, when content displayed on an output screen of the electronic device 200 is content of a first type, the electronic device 200 may determine the transmission protocol as a first protocol. For example, when the content displayed on the output screen of the electronic device 200 is content of a second type, the electronic device 200 may determine the transmission protocol as a second protocol. For example, the first protocol may be different from the second protocol.

For example, when the content to be transmitted is video content, the electronic device 200 may determine a streaming protocol as the transmission protocol. For example, the streaming protocol may be a network transmission protocol configured to support media streaming. For example, the first protocol may include WebRTC, HLS, MPEG-DASH, etc. For example, the video content transmitted through the streaming protocol may be played back by the display apparatus 100, and a playback latency of the video content played back by the display apparatus 100 may be reduced or minimized.

For example, when the content to be transmitted is document content, the electronic device 200 may determine a remote desktop protocol as the transmission protocol. For example, the remote desktop protocol may be a network transmission protocol configured to transmit various types of data including inputs of audio, a mouse, and a keyboard, as well as graphics data. For example, the second protocol may include an RDP, VNC, SSH, etc. For example, the document content transmitted through the remote desktop protocol may be processed by the display apparatus 100, and a text resolution, i.e., the text visibility, of the document content output by the display apparatus 100 may be maximized.

In operation S330, the electronic device 200 according to an embodiment of the disclosure may respond to the display apparatus 100 by transmitting information about a determined protocol to the display apparatus 100.

For example, when it is determined that the content to be transmitted is content of the first type, the electronic device 200 may transmit information about the first protocol to the display apparatus 100. For example, when it is determined that the content to be transmitted is content of the second type, the electronic device 200 may transmit information about the second protocol to the display apparatus 100.

For example, the electronic device 200 and the display apparatus 100 may determine the protocol according to the type of the content to be transmitted, through negotiation. For example, the electronic device 200 may transmit the information about the protocol to the display apparatus 100 in advance, so that the display apparatus 100 may rapidly determine the transmission protocol and arrange a pipeline for processing data. The display apparatus 100 may rapidly process and output content received from the electronic device 200 using the pre-arranged pipeline.

In operation S340, the display apparatus 100 according to an embodiment of the disclosure may arrange the pipeline for processing the content, based on the information about the protocol.

For example, the display apparatus 100 may determine the transmission protocol, based on the information about the protocol. For example, the display apparatus 100 may determine the first protocol as the transmission protocol based on the information about the first protocol. For example, the display apparatus 100 may determine the second protocol as the transmission protocol based on the information about the second protocol. According to an embodiment of the disclosure, for example, the display apparatus 100 may select a first transmission protocol or a second transmission protocol based on the information about the protocol.

For example, the display apparatus 100 may generate the pipeline for processing data by determining or selecting the protocol. For example, when a type of the protocol is changed, the pipeline for processing the received data may be changed.

For example, the display apparatus 100 may arrange a pipeline corresponding to the first protocol, based on receiving the information about the first protocol. For example, the display apparatus 100 may arrange a playback pipeline corresponding to a streaming protocol, based on receiving of information about the streaming protocol. The playback pipeline may include, for example, a suitable logic, circuit, interface, and/or code for receiving, decoding, and rendering video data corresponding to video content. For example, the display apparatus 100 may play the video content using the playback pipeline. For example, the playback pipeline may be included in the streaming processing module 101, an example of which is discussed below with reference to FIG. 7.

For example, the display apparatus 100 may arrange a pipeline corresponding to the second protocol, based on receiving the information about the second protocol. For example, the display apparatus 100 may arrange a pipeline corresponding to a remote desktop protocol, based on receiving of information about the remote desktop protocol. The pipeline may include, for example, a suitable logic, circuit, interface, and/or code for receiving graphics data corresponding to document content, decrypting and framing bitmap data storing a difference between a current frame and a previous frame. For example, the display apparatus 100 may frame the document content using the pipeline. According to an embodiment of the disclosure, the pipeline for processing the document content may not include a decoder. For example, the display apparatus 100 may omit an operation of decompressing the content received through the remote desktop protocol. For example, the pipeline may be included in the remote desktop client module 102 an example of which is discussed below with reference to FIG. 7.

In operation S350, the display apparatus 100 according to an embodiment of the disclosure may transmit a request for content to the electronic device 200.

In operation S360, the electronic device 200 according to an embodiment of the disclosure may respond to the display apparatus 100 by transmitting, through the determined protocol, the content to the display apparatus 100. For example, in response to receiving the request for the content, the electronic device 200 may transmit the content according to the determined protocol.

As an example, the electronic device 200 may transmit the content of the first type through the first protocol. For example, the electronic device 200 may encode the video data corresponding to the video content and transmit the encoded video data to the display apparatus 100, through the streaming protocol.

As another example, the electronic device 200 may transmit the content of the second type through the second protocol. For example, the electronic device 200 may generate a difference between a current frame and a previous frame in the form of bitmap data and transmit the bitmap data to the display apparatus 100, through the remote desktop protocol.

As an example, the display apparatus 100 may receive the content of the first type through the first protocol. As another example, the display apparatus 100 may receive the content of the second type through the second protocol.

In operation S370, the display apparatus 100 according to an embodiment of the disclosure may output, using the pipeline, the content received from the electronic device 200 through the protocol.

As an example, the display apparatus 100 may output, using the playback pipeline, the video content received from the electronic device 200 through the determined first protocol. For example, the display apparatus 100 may play the video content by decoding and rendering the encoded video data, using the playback pipeline. For example, the display apparatus 100 may receive and process the video content through the streaming protocol, and thus, may reduce the latency of the video content.

As another example, using the pipeline, the display apparatus 100 may output, on a display, the document content received from the electronic device 200 through the determined second protocol. For example, the display apparatus 100 may output the document content as an image by decrypting encoded graphics data and framing the decrypted data, using the pipeline. For example, through the remote desktop protocol, the display apparatus 100 may omit a compression or decompression process of encoding or decoding the document content. Thus, the loss of data may be reduced or minimized and text visibility of the document content may be improved.

The electronic device 200 according to an embodiment of the disclosure may determine the protocol according to the type of the content and may transmit, to the display apparatus 100, the information about the determined protocol and the content according to the determined protocol. The electronic device 200 may determine the transmission protocol suitable for transmitting each of the video content and the document content, and thus, the latency of the video content may be reduced or minimized and the text visibility of the document content may be increased or maximized, the video content and the document content being output by the display apparatus 100.

The display apparatus 100 according to an embodiment of the disclosure may determine the suitable protocol for receiving each of the video content and the document content and may output the content using the different pipelines. Therefore, when the display apparatus 100 outputs the video content, the latency may be reduced or minimized, and when the display apparatus 100 outputs the document content, the text visibility may be increased or maximized.

Figure 4:
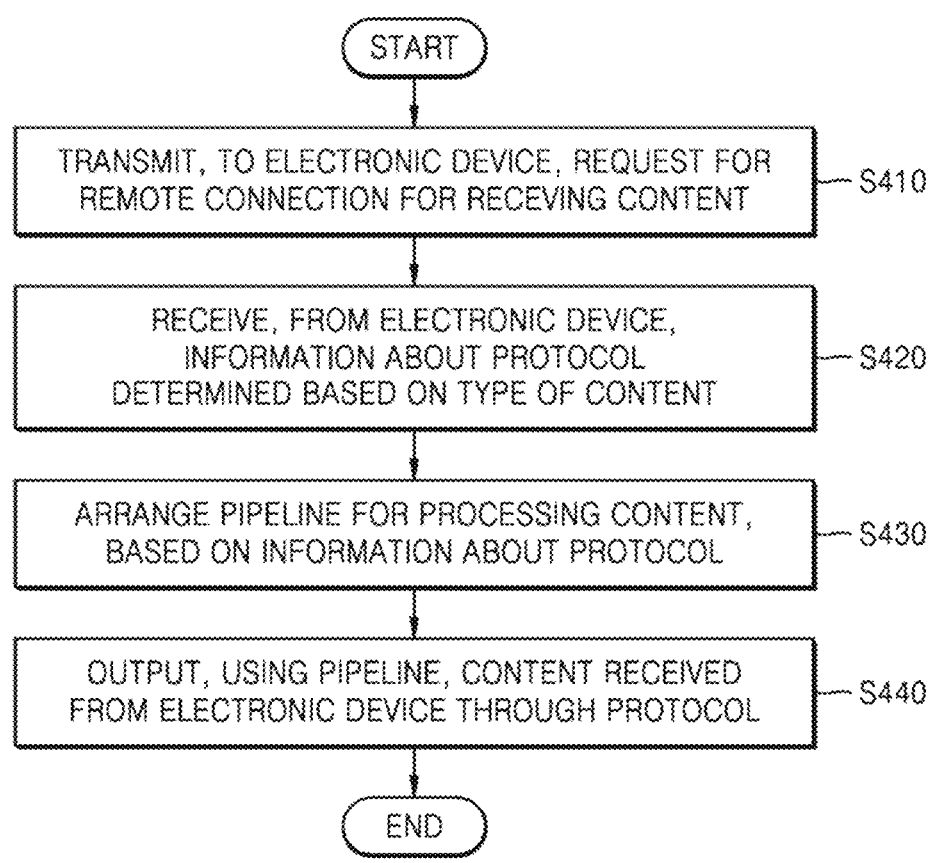
FIG. 4 is an example of a flowchart showing an operation of a display apparatus, according to an embodiment of the disclosure.

FIG. 4 is an example of a flowchart of an operation of a display apparatus, according to an embodiment of the disclosure.

Referring to FIG. 4, in operation S410, the display apparatus 100 according to an embodiment of the disclosure may transmit, to the electronic device 200, a request for remote connection for receiving content.

In operation S420, the display apparatus 100 according to an embodiment of the disclosure may receive, from the electronic device 200, information about a protocol determined based on a type of the content.

For example, when it is determined that the content to be transmitted is content of a first type, the electronic device 200 may transmit information about a first protocol to the display apparatus 100. For example, the display apparatus 100 may receive the information about the first protocol from the electronic device 200.

For example, when it is determined that the content to be transmitted is content of a second type, the electronic device 200 may transmit information about a second protocol to the display apparatus 100. For example, the display apparatus 100 may receive the information about the second protocol from the electronic device 200.

In operation S430, the display apparatus 100 according to an embodiment of the disclosure may arrange a pipeline for processing the content, based on the information about the protocol.

For example, the display apparatus 100 may determine a transmission protocol based on the information about the protocol. As an example, the display apparatus 100 may determine the first protocol as the transmission protocol, based on the information about the first protocol. As another example, the display apparatus 100 may determine the second protocol as the transmission protocol, based on the information about the second protocol.

For example, the display apparatus 100 may generate the pipeline for processing data, based on the display apparatus 100 determining the protocol. For example, when a type of the protocol is changed, the pipeline for processing the received data may be changed.

As an example, the display apparatus 100 may arrange a pipeline including a decoder, based on receiving the information about the first protocol. For example, the display apparatus 100 may arrange a playback pipeline for processing video content, based on receiving of information about a streaming protocol, wherein the playback pipeline may include a decoder. For example, the playback pipeline may be included in the streaming processing module 101 of FIG. 7, described below.

As another example, the display apparatus 100 may arrange a pipeline not including the decoder, based on receiving the information about the second protocol. For example, the display apparatus 100 may arrange a pipeline for processing document content, based on receiving of information about a remote desktop protocol, wherein the pipeline for processing the document content may not include a decoder. For example, the pipeline may be included in the remote desktop client module 102 of FIG. 7, described below.

In operation S440, the display apparatus 100 according to an embodiment of the disclosure may output, using the pipeline, the content received from the electronic device 200 through the protocol.

For example, when the arranging the pipeline for processing data is completed, the display apparatus 100 may request the content from the electronic device 200. The electronic device 200 may transmit the video content through the first protocol or transmit the document content through the second protocol.

The display apparatus 100 according to an embodiment of the disclosure may receive the content of the first type through the first protocol, when the information about the protocol, received from the electronic device 200, indicates the first protocol. The display apparatus 100 according to an embodiment of the disclosure may receive the content of the second type through the second protocol, when the information about the protocol, received from the electronic device 200, indicates the second protocol, which is different from the first protocol.

As an example, the display apparatus 100 may play, using the pipeline, the video data corresponding to the content of the first type, received from the electronic device 200 through the streaming protocol. As another example, using the pipeline, the display apparatus 100 may process and output, on a display, the image data corresponding to the content of the second type, received from the electronic device 200 through the remote desktop protocol.

The display apparatus 100 according to an embodiment of the disclosure may receive the content through the different protocols according to the type of the content. The display apparatus 100 may determine, as the transmission protocol, the protocol suitable for each of the video content and the document content, and thus, when the display apparatus 100 outputs the video content, the latency may be reduced or minimized, and when the display apparatus 100 outputs the document content, the visibility of text may be increased or maximized.

According to an embodiment of the disclosure, the display apparatus 100 may determine whether to change the protocol based on an output screen of the content received from the electronic device 200. The display apparatus 100 may determine a state of the output screen and may determine that a current protocol is non-suitable for receiving the content. When the display apparatus 100 determines that the protocol is non-suitable, the display apparatus 100 may perform an operation of changing the protocol. Also, the display apparatus 100 may transmit a request for changing the protocol to the electronic device 200. An example of this aspect is described in detail below with reference to operation S640 of FIG. 6.

An operating method of the display apparatus 100 according to an embodiment of the disclosure may include: transmitting, to the electronic device 200, a request for remote connection for receiving content; receiving information about a protocol determined based on a type of content from the electronic device 200; arranging a pipeline for processing the content, based on the information about the protocol; and outputting the content received from the electronic device 200 through the protocol, using the pipeline.

The operating method of the display apparatus 100 according to an embodiment of the disclosure may include: determining, based on an output screen of the content, whether to change the protocol; and transmitting, a request for changing the protocol, to the electronic device 200, when it is determined to change the protocol.

The receiving, from the electronic device 200, of the information about the protocol determined based on the type of the content may include: receiving content of a first type through a first protocol, based on the information about the protocol received from the electronic device 200 indicating the first protocol; and receiving content of a second type through a second protocol, based on the information about the protocol received from the electronic device 200 indicating the second protocol, which is different from the first protocol.

The arranging of the pipeline for processing the content, based on the information about the protocol, may include: arranging a pipeline including a decoder, based on the receiving, from the electronic device 200, of the information about the first protocol; and arranging a pipeline not including the decoder, based on the receiving, from the electronic device 200, of the information about the second protocol.

Figure 5:
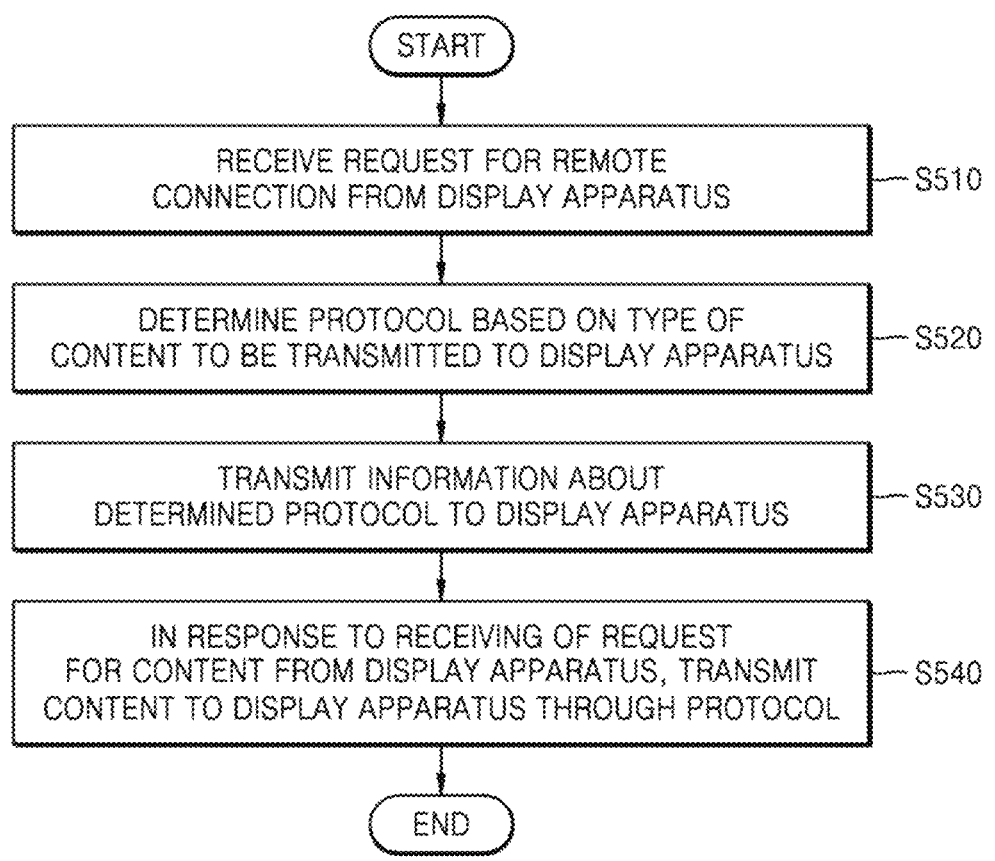
FIG. 5 is an example of a flowchart showing an operation of an electronic device, according to an embodiment of the disclosure.

FIG. 5 is an example of a flowchart showing an operation of an electronic device, according to an embodiment of the disclosure.

Referring to FIG. 5, in operation S510, the electronic device 200 according to an embodiment of the disclosure may receive a request for remote connection from the display apparatus 100.

In operation S520, the electronic device 200 according to an embodiment of the disclosure may determine a protocol based on a type of content to be transmitted to the display apparatus 100.

For example, the electronic device 200 may identify the type of the content to be transmitted, in response to the request for remote connection. For example, the electronic device 200 may determine a protocol suitable for transmitting the content, according to the type of the content to be transmitted.

For example, the electronic device 200 may classify the type of the content based on a feature of the content and may determine, according to the type of the content, the protocol to be used for transmitting the content. For example, the electronic device 200 may store metadata including an attribute, type, genre, etc. of an application. For example, the electronic device 200 may identify the metadata defined in the application, thereby identifying whether the application provides video content or document content. For example, a game application may have attribute information indicating that the game application provides metadata of a first type, and a document-editing application may have attribute information indicating that the document-editing application provides metadata of a second type.

According to an embodiment of the disclosure, for example, the electronic device 200 may identify a type of the application through a file extension of an execution file. For example, when the file extension is ".mp4," the electronic device 200 may determine that a file is video content, and when the file extension is ".doc" or ".docx," the electronic device 200 may determine that a file is document content based on the document-editing application.

For example, in response to identifying of content of the first type, the electronic device 200 may transmit information about a first protocol to the display apparatus 100.

For example, in response to identifying of content of the second type, the electronic device 200 may transmit information about a second protocol, which is different from the first protocol, to the display apparatus 100.

For example, the content of the first type may include video content, and the first protocol may be a streaming protocol for reducing or minimizing the latency of the video content. For example, the content of the second type may include document content, and the second protocol may be a remote desktop protocol for increasing or maximizing the visibility of text of the document content.

In operation S530, the electronic device 200 according to an embodiment of the disclosure may transmit information about the determined protocol to the display apparatus 100.

For example, when the electronic device 200 determines the first protocol as a transmission protocol, the electronic device 200 may transmit the information about the first protocol to the display apparatus 100. For example, when the electronic device 200 determines the second protocol as the transmission protocol, the electronic device 200 may transmit the information about the second protocol to the display apparatus 100.

For example, the electronic device 200 may transmit the information about protocol to the display apparatus 100 in advance, so that the display apparatus 100 may rapidly determine the protocol and arrange a pipeline for processing data. Accordingly, the display apparatus 100 may rapidly process and output the content received from the electronic device 200.

In operation S540, the electronic device 200 according to an embodiment of the disclosure may transmit content to the display apparatus 100 through the protocol, in response to receiving, from the display apparatus 100, a request for the content.

For example, the electronic device 200 may transmit the content according to the determined protocol, in response to receiving the request for the content. For example, the electronic device 200 may transmit the video content according to the first protocol or the document content according to the second protocol.

The electronic device 200 according to an embodiment of the disclosure may determine the protocol according to the type of the content and may transmit, to the display apparatus 100, the information about the determined protocol and the content according to the determined protocol. The electronic device 200 may determine the protocol suitable for transmitting each of the video content and the document content, and thus, the latency of the video content may be minimized and the text visibility of the document content may be maximized, the video content and the document content being output by the display apparatus 100.

According to an embodiment of the disclosure, the electronic device 200 may receive, from the display apparatus 100, a request for changing the protocol. The electronic device 200 may perform an operation of changing the protocol, based on the request for changing the protocol. The electronic device 200 may transmit the content through the changed protocol. An example of this aspect is described in detail below with reference to operation S640 of FIG. 6.

Figure 6:
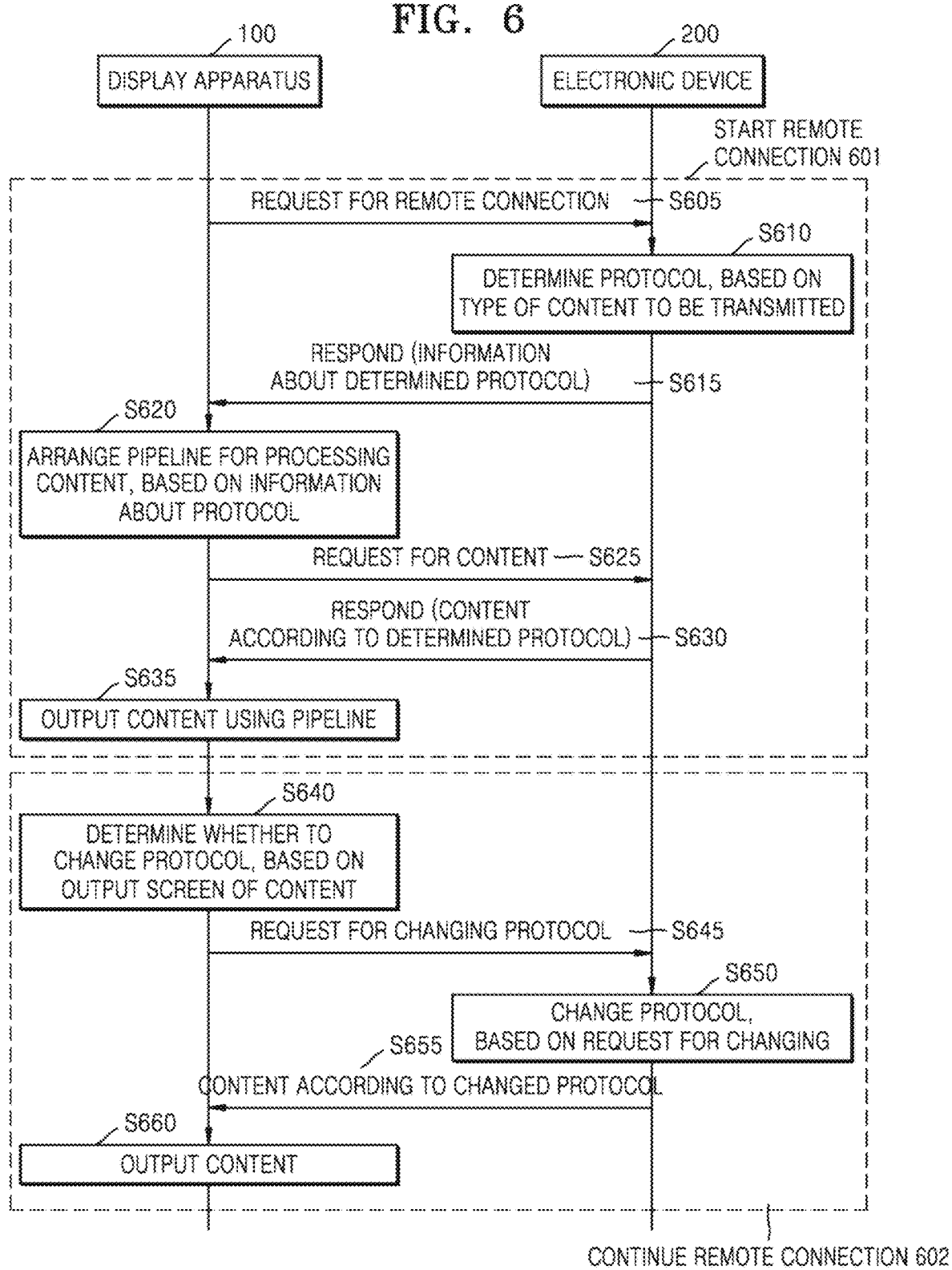
FIG. 6 is an example of a flowchart showing general operations of a display apparatus and an electronic device, according to an embodiment of the disclosure.

FIG. 6 is an example of a flowchart showing general operations of a display apparatus and an electronic device, according to an embodiment of the disclosure.

Referring to FIG. 6, the display apparatus 100 and electronic device 200 may provide a remote connection service. In an operation 601 of starting remote connection, the display apparatus 100 and the electronic device 200 may determine a transmission protocol to transmit content, based on a type of the content to be transmitted. According to an embodiment of the disclosure, in an operation 602 of continuing the remote connection, the display apparatus 100 and the electronic device 200 may determine whether to change the transmission protocol to transmit the content.

According to an embodiment of the disclosure, the operation 601 of starting the remote connection may be substantially the same as described with reference to FIG. 3, and thus, redundant or duplicative description is omitted, and an example of the determining of whether to change the transmission protocol, included in the operation 602 of continuing the remote connection, is described in detail.

In operation S605, the display apparatus 100 may transmit a request for remote connection to the electronic device 200. According to an embodiment of the disclosure, operation S605 may correspond to operation S310 of FIG. 3.

In operation S610, the electronic device 200 may determine a protocol based on a type of content to be transmitted. According to an embodiment of the disclosure, operation S610 may correspond to operation S320 of FIG. 3.

In operation S615, the electronic device 200 may transmit information about the determined protocol to the display apparatus 100. According to an embodiment of the disclosure, operation S615 may correspond to operation S330 of FIG. 3.

In operation S620, the display apparatus 100 may arrange a pipeline for processing the content, based on the information about the protocol. According to an embodiment of the disclosure, operation S620 may correspond to operation S340 of FIG. 3.

In operation S625, the display apparatus 100 may transmit a request for the content to the electronic device 200. According to an embodiment of the disclosure, operation S625 may correspond to operation S350 of FIG. 3.

In operation S630, the electronic device 200 according to an embodiment of the disclosure may transmit, to the display apparatus 100, the content through the determined protocol. According to an embodiment of the disclosure, operation S630 may correspond to operation S360 of FIG. 3.

In operation S635, the display apparatus 100 may output, using the pipeline, the content received from the electronic device 200 through the pipeline. According to an embodiment of the disclosure, operation S635 may correspond to operation S370 of FIG. 3.

For example, the display apparatus 100 may output the content received from the electronic device 200. As an example, the display apparatus 100 may receive video content from the electronic device 200 through a first protocol and may process the video content through the pipeline arranged by the display apparatus 100 to playback the video content on a display. As another example, the display apparatus 100 may receive document content from the electronic device 200 through a second protocol and may process the document content through the pipeline arranged by the display apparatus 100 to display the document content on the display.

The display apparatus 100 and the electronic device 200 according to an embodiment of the disclosure may provide a remote connection service by which a suitable protocol according to a type of content is determined and the content is transmitted and received according to the determined protocol. For example, the display apparatus 100 and the electronic device 200 may determine the protocol suitable for transmitting and receiving each of the video content and the document content, and thus, may reduce or minimize the latency of the video content and increase or maximize the visibility of the document content.

Next, in the operation 602 of continuing the remote connection, operations S640, S645, S650, S655, and S660 may be performed.

In operation S640, the display apparatus 100 may determine whether to change the protocol based on an output screen of the content.

For example, the display apparatus 100 may determine a state of the output screen of the content received from the electronic device 200 and may determine whether the output screen falls short of a predetermined standard. For example, when the output screen falls short of the predetermined standard, the display apparatus 100 may determine that the protocol is non-suitable and may be changed.

For example, when it is determined that the protocol is non-suitable, the display apparatus 100 may transmit a request for changing the protocol to the electronic device 200. For example, when it is determined that the protocol is suitable, the display apparatus 100 may continue to receive the content according to the current protocol and output the content.

For example, the display apparatus 100 may determine, using a first process, the state of the output screen of content received through a streaming protocol, and may determine, using a second process, the state of the output screen of content received through a remote desktop protocol. In this case, the first process and the second process may be different from each other.

For example, while the remote connection is maintained, a user may end the video content that is executed and may execute the document content. In this case, the streaming protocol and the playback pipeline for processing the video content may be non-suitable for processing the document content. For example, when the document content is processed by the display apparatus 100 through the streaming protocol and the playback pipeline, text resolution may be low.

For example, when it is determined that the visibility of text of the output screen of the content received through the streaming protocol is low, the display apparatus 100 may determine that the streaming protocol is non-suitable. In this case, the display apparatus 100 may determine to change the streaming protocol to the remote desktop protocol.

For example, according to the first process according to an embodiment of the disclosure, the display apparatus 100 may determine a text resolution of the content received from the electronic device 200 through the first protocol and based on determining that the text resolution is less than a first threshold value, may transmit a request for changing the protocol to the second protocol to the electronic device 200. Examples of aspects of the first process are described below with reference to FIGS. 10A and 11.

Also, for example, while the remote connection is maintained, the user may end the document content that is executed and may execute video content. In this case, the remote desktop streaming protocol and the pipeline for processing the document content may be non-suitable for processing the video content. For example, when the video content is processed by the display apparatus 100 through the remote desktop protocol and the pipeline, the latency of the content may be high, and the playback may be continually disconnected.

For example, when it is determined that the latency is high and the playback is disconnected on the output screen of the content received through the remote desktop protocol, the display apparatus 100 may determine that the remote desktop protocol is non-suitable. In this case, the display apparatus 100 may determine that there is a need to change the remote desktop protocol to the streaming protocol.

For example, according to the second process according to an embodiment of the disclosure, the display apparatus 100 may determine the amount of change of an image of the content received from the electronic device 200 through the second protocol and based on determining that the amount of change of the image is greater than a second threshold value, may transmit, to the electronic device 200, a request for changing the protocol to the first protocol. Aspects about the second process are described below with reference to FIGS. 10B and 12.

For example, the display apparatus 100 may periodically determine whether to change the protocol, while the remote connection with the electronic device 200 is being continued. For example, while the remote connection is being continued, the display apparatus 100 may determine a state of a current output screen and may determine the suitability of the protocol for every few minutes or few seconds.

In operation S645, when it is determined that the protocol is non-suitable, the display apparatus 100 may transmit a request for changing the protocol to the electronic device 200. For example, the display apparatus 100 may transmit a request for changing the protocol to the first protocol or a request for changing the protocol to the second protocol. Also, for example, when the display apparatus 100 determines that the protocol is non-suitable, the display apparatus 100 may perform an operation of changing the protocol.

However, when it is determined that the protocol is suitable, the display apparatus 100 may maintain the operation of operation S635. For example, when it is determined that the protocol is suitable, the display apparatus 100 may not change the current protocol and receive content through the currently determined protocol and may output the content using the currently arranged pipeline.

In operation S650, the electronic device 200 may perform an operation of changing the protocol, in response to the request for changing the protocol received from the display apparatus 100.

For example, in response to receiving the request for changing the protocol from the display apparatus 100, the electronic device 200 change a transmission protocol from the first protocol to the second protocol. For example, in response to receiving the request for changing the protocol from the display apparatus 100, the electronic device 200 change a transmission protocol from the second protocol to the first protocol.

For example, the electronic device 200 may change the protocol such that the video content may be transmitted through the streaming protocol and the document content may be transmitted through the remote desktop protocol.

In operation S655, the electronic device 200 may transmit the content to the display apparatus 100 according to the changed protocol. For example, the electronic device 200 may transmit the content through the first protocol or may transmit the content through the second protocol.

In operation S660, the display apparatus 100 may output the content again based on the reception of the content from the electronic device 200. For example, the display apparatus 100 may receive the content through the changed protocol. For example, the display apparatus 100 may process the content using a pipeline corresponding to the changed protocol and may display the content on the display.

The display apparatus 100 according to an embodiment of the disclosure may determine, by determining a state of the current output screen, whether content is received through a suitable protocol. When it is determined that the content is currently received through a non-suitable protocol, the display apparatus 100 may request the electronic device 200 to change the protocol to a suitable protocol. Thus, the display apparatus 100 may continue to reduce or minimize the latency of the video content or may continue to increase or maximize the visibility of text data of the document content, while the remote connection is maintained.

Figure 7:
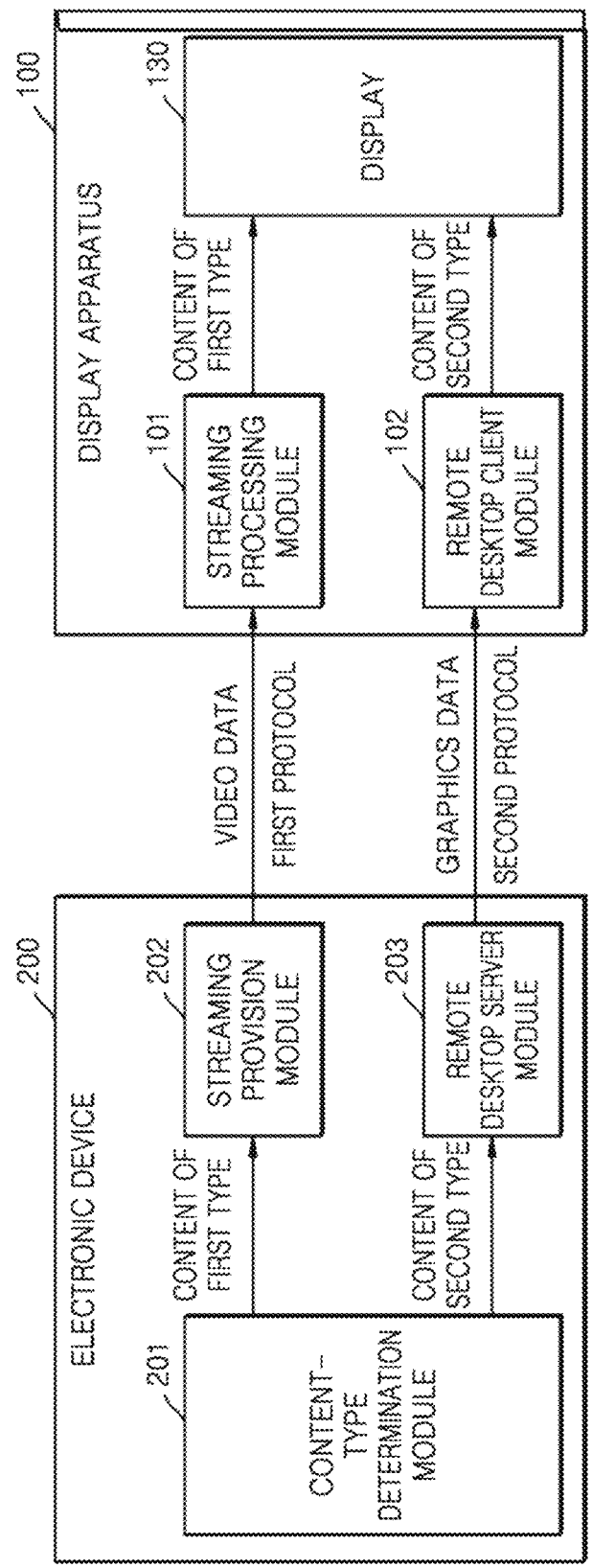
FIG. 7 is a diagram showing an example of a configuration in which a display apparatus and an electronic device process content, according to an embodiment of the disclosure.

FIG. 7 is a diagram showing an example of a configuration in which a display apparatus and an electronic device process content, according to an embodiment of the disclosure.

Referring to FIG. 7, the electronic device 200 may include the content-type determination module 201, the streaming provision module 202, and the remote desktop server module 203, in order to provide content to the display apparatus 100, according to an embodiment of the disclosure.

The content-type determination module 201 may include a suitable logic, circuit, interface, and/or code which may operate to determine a type of content for the electronic device 200 to transmit according to a request of the display apparatus 100 for remote connection. The content-type determination module 201 may identify each of content of a first type and content of a second type. The content identified through the content-type determination module 201 may be transmitted by any one of the streaming provision module 202 and the remote desktop server module 203.

The streaming provision module 202 may include a suitable logic, circuit, interface, and/or code which may operate to receive the content of the first type and provide the content of the first type as streams. The streaming provision module 202 may receive the content of the first type as streams, may compress streaming data, and transmit the compressed video data to the display apparatus 100. The streaming provision module 202 may transmit the video content to the streaming processing module 101 in the form of a packet through the first protocol. The streaming provision module 202 may include a media codec including an encoder. The streaming provision module 202 may include a pipeline realizing a streaming protocol.

The remote desktop server module 203 may include a suitable logic, circuit, interface, and/or code which may operate to receive content of a second type and provide the content of the second type as graphics data. The remote desktop server module 203 may receive the content of the second type as graphics data. The remote desktop server module 203 may determine a difference between a current frame and a previous frame of content that is executed by the electronic device 200 and may cache the current frame for comparison between a subsequent frame and the current frame. Also, the remote desktop server module 203 may generate a difference between a current frame and a previous frame in the form of bitmap data and may transmit the bitmap data through a remote desktop protocol. The remote desktop server module 203 may include a pipeline realizing the remote desktop protocol. In some embodiments, the remote desktop server module 203 may not include an encoder.

The streaming provision module 202 may transmit the video content to the streaming processing module 101 through the first protocol. The remote desktop server module 203 may transmit the graphics data to the remote desktop client module 102 through the second protocol. The video data may be the streaming data, and the graphics data may be the bitmap data.

The display apparatus 100 may include the streaming processing module 101, the remote desktop client module 102, and the display 130.

The streaming processing module 101 may include a suitable logic, circuit, interface, and/or code which may operate to convert and provide, to the display 130, the video data received from the streaming provision module 202 of the electronic device 200. For example, the streaming processing module 101 may include a buffer configured to receive video data corresponding to the content of the first type, a decoder configured to decode the video data output from the buffer, and a renderer configured to render the decoded video data. The streaming processing module 101 may process the video content to be displayed by the display 130. For example, the streaming processing module 101 may include a pipeline corresponding to the streaming protocol.

The remote desktop client module 102 may include a suitable logic, circuit, interface, and/or code which may operate to convert and provide, to the display 130, the graphics data received from the remote desktop server module 203 of the electronic device 200. For example, the remote desktop client module 102 may convert the bitmap data storing the difference between the current frame and the previous frame into information in a form which may be displayed on the display 130. The remote desktop client module 102 may not include a decoder. For example, the remote desktop client module 102 may include a pipeline corresponding to the remote desktop protocol.

The display 130 may display, on the screen, data received from the streaming processing module 101 and the remote desktop client module 102, The video data may be decoded through the streaming processing module 101 and may be converted into information in a form which may be displayed on the display 130. The graphics data may be converted into information in a form which may be displayed on the display 130, through the remote desktop client module 102.

FIG. 7 illustrates an example in which the content-type determination module 201, the streaming provision module 202, and the remote desktop server module 203 are separate elements. However, embodiments are not limited thereto, and in some embodiments the function or functions performed by one or more of the content-type determination module 201, the streaming provision module 202, and the remote desktop server module 203 may be performed by the processor 210. Also, in the example shown in FIG. 7, the streaming processing module 101 and the remote desktop client module 102 are illustrated as separate elements. However, embodiments are not limited thereto, and in some embodiments the function or functions performed by one or more of the streaming processing module 101 and the remote desktop client module 102 may be performed by the processor 110.

Figure 8:
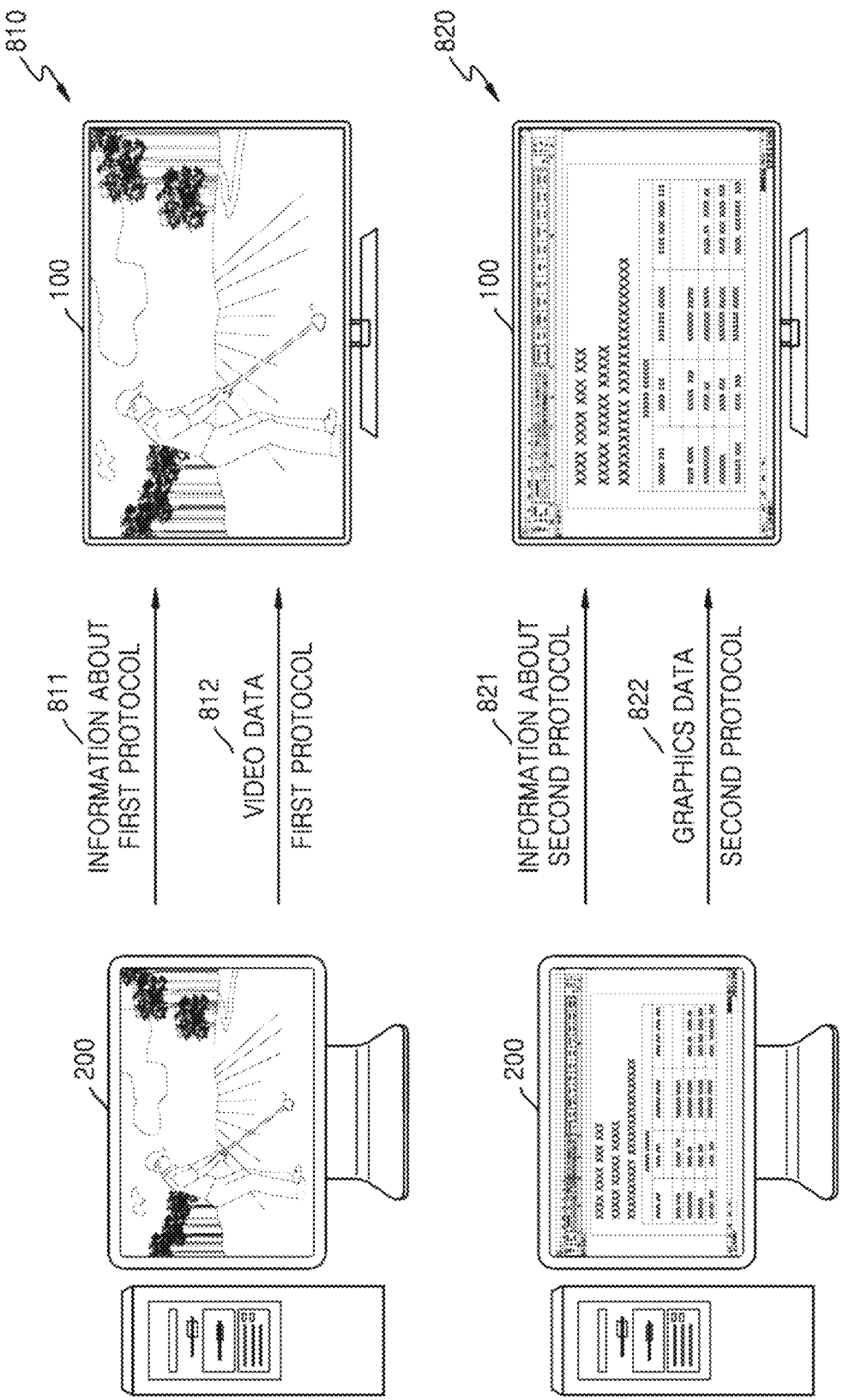
FIG. 8 is a diagram for describing a remote connection service according to a type of content in a display apparatus and an electronic device, according to an embodiment of the disclosure.

FIG. 8 is a diagram for describing a remote connection service according to a type of content in a display apparatus and an electronic device, according to an embodiment of the disclosure.

Referring to FIG. 8, examples of a first scenario 810 in which video content is transmitted and received and a second scenario 820 in which document content is transmitted and received, according to a remote connection service, are described.

In the first scenario 810, the electronic device 200 may determine a first protocol as a transmission protocol, based on the content to be provided, the content corresponding to the video content, and may transmit information 811 about the first protocol to the display apparatus 100. The electronic device 200 may transmit, through the first protocol, video data 812 encoded through the streaming provision module 202. The display apparatus 100 may determine the first protocol as a transmission protocol, based on the reception of the information 811 about the first protocol, and may arrange a pipeline through the streaming processing module 101. The display apparatus 100 may output the video content by decoding the video data 812 received through the first protocol.

In the second scenario 820, the electronic device 200 may determine the second protocol as a transmission protocol, based on the content to be provided, the content corresponding to the image content, and may transmit information 821 about the second protocol to the display apparatus 100. The electronic device 200 may transmit, through the second protocol, graphics data 822 through the remote desktop server module 203. The display apparatus 100 may determine the second protocol as the transmission protocol, based on the reception of the information 821 about the second protocol, and may generate a pipeline through the remote desktop client module 102. The display apparatus 100 may output the document content by decoding the graphics data 822 received through the second protocol.

Figure 9:
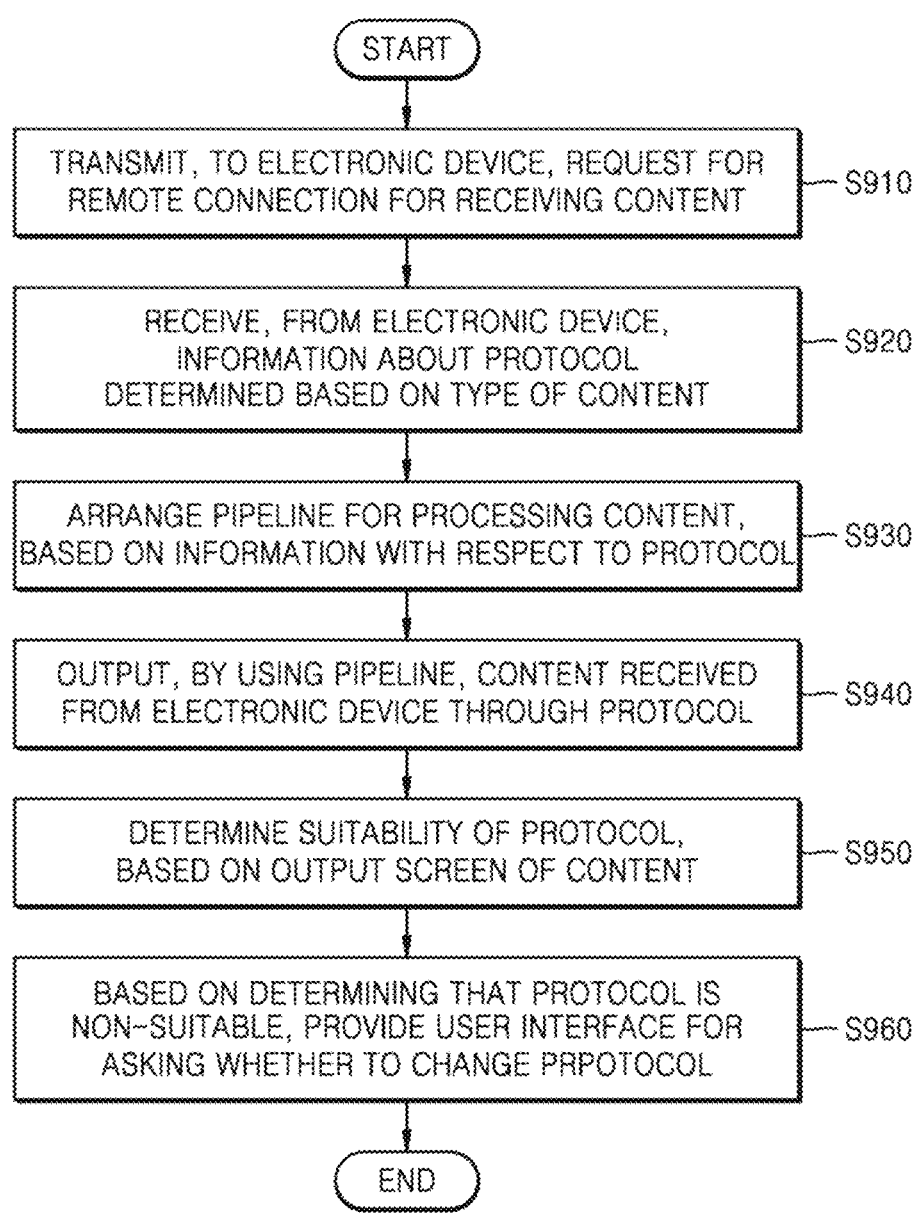
FIG. 9 is an example of a flowchart showing an operation of a display apparatus, according to an embodiment of the disclosure.

FIG. 9 is an example of a flowchart showing an operation of a display apparatus, according to an embodiment of the disclosure.

In operation S910, the display apparatus 100 according to an embodiment of the disclosure may transmit a request for remote connection for receiving content, to the electronic device 200. According to an embodiment of the disclosure, operation S910 may correspond to operation S410 of FIG. 4.

In operation S920, the display apparatus 100 according to an embodiment of the disclosure may receive, from the electronic device 200, information about a protocol determined based on a type of content. According to an embodiment of the disclosure, operation S920 may correspond to operation S420 of FIG. 4.

In operation S930, the display apparatus 100 according to an embodiment of the disclosure may arrange a pipeline for processing content, based on the information about the protocol. According to an embodiment of the disclosure, operation S930 may correspond to operation S430 of FIG. 4.

In operation S940, the display apparatus 100 according to an embodiment of the disclosure may output, using the pipeline, the content received from the electronic device 200 through the protocol. According to an embodiment of the disclosure, operation S940 may correspond to operation S440 of FIG. 4.

In operation S950, the display apparatus 100 according to an embodiment of the disclosure may determine suitability of the protocol, based on an output screen of the content. An example of the operation, performed by the display apparatus 100, of determining the suitability of the protocol, according to an embodiment of the disclosure, is described in detail below with reference to FIGS. 10A and 10B.

In operation S960, based on determining that the protocol is non-suitable, the display apparatus 100 may provide a user interface for asking whether to change the protocol. For example, the display apparatus 100 may output, on a display, a graphics user interface for asking whether to change the protocol. For example, the display apparatus 100 may output a sound user interface, etc. for asking whether to change the protocol.

Hereinafter, referring to FIGS. 10A to 12, a process, performed by the display apparatus 100, of determining suitability of a protocol, according to an embodiment of the disclosure, is described.

Figure 10A:
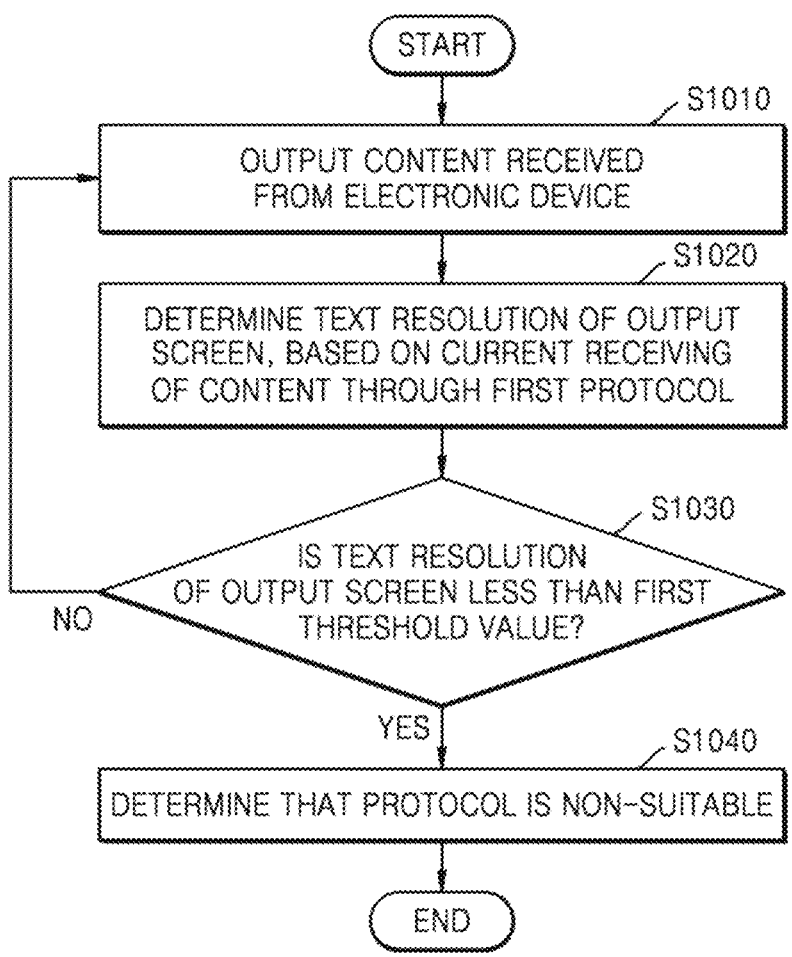
FIGS. 10A and 10B are examples of a flowchart showing in detail a protocol suitability determination operation of a display apparatus, according to an embodiment of the disclosure.
Figure 10B:
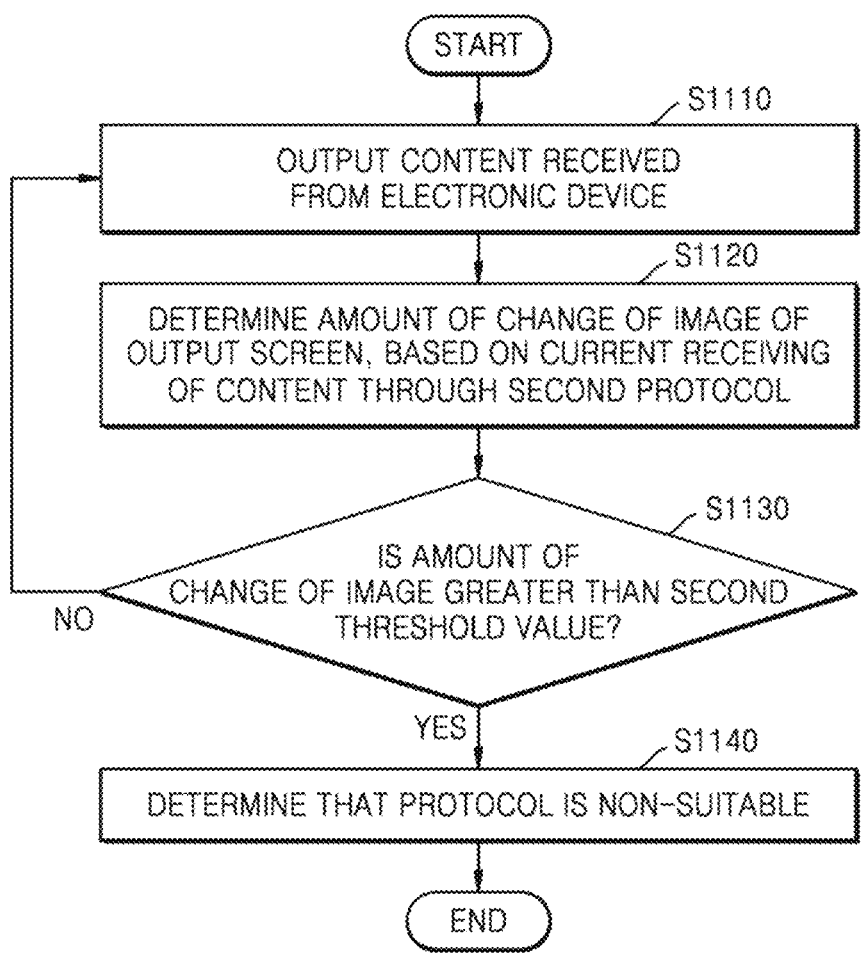

FIGS. 10A and 10B are examples of a flowchart showing in detail a protocol suitability determination operation of a display apparatus, according to an embodiment of the disclosure. FIG. 10A illustrates a first protocol suitability determination operation of the display apparatus 100 according to an embodiment of the disclosure, and FIG. 10B illustrates a second protocol suitability determination operation of the display apparatus 100 according to an embodiment of the disclosure.

Referring to FIG. 10A, in operation S1010, the display apparatus 100 may output content received through remote connection with the electronic device 200. The display apparatus 100 may receive data through the first protocol or the second protocol.

In operation S1020, the display apparatus 100 may determine a text resolution of an output screen, based on current receiving of content through the first protocol.

For example, when the display apparatus 100 determines that content is received through the first protocol, the display apparatus 100 may determine whether the first protocol is suitable for receiving the content. For example, when the display apparatus 100 determines that the content is input to a pipeline corresponding to the first protocol, the display apparatus 100 may determine that the content is currently received through the first protocol. For example, when the display apparatus 100 determines that data is input to the streaming processing module 101, the display apparatus 100 may determine that the data is received through the first protocol.

For example, in order to determine the suitability of the first protocol, the display apparatus 100 may determine the text resolution of an output screen of the content received through the first protocol. For example, the display apparatus 100 may decompress compressed data received through a streaming protocol, and in this case, when the received content is video content, the streaming protocol may be a suitable protocol. However, when the content received by the display apparatus 100 is document content, text data may be distorted and the visibility may deteriorate in a decoding process for the decompression, and thus, a remote desktop protocol, rather than the streaming protocol, may be a suitable protocol. Thus, based on the determining that the data is received through the first protocol, the display apparatus 100 may determine whether the text resolution of a current output screen is low.

For example, the display apparatus 100 may periodically determine the text resolution of an output screen of the content.

In operation S1030, the display apparatus 100 may determine whether the text resolution of the output screen is less than a first threshold value.

For example, the display apparatus 100 may perform various operations for determining the text resolution of the output screen. For example, the display apparatus 100 may detect a text area of the output screen and may determine the resolution of the text area according to an image processing algorithm. In some embodiments, for example, the display apparatus 100 may determine noise of the text area using a peak signal-to-noise ratio (PSNR) process. In some embodiments, for example, the display apparatus 100 may determine the resolution of the text area using a text resolution learning model. Here, the first threshold value may be a reference value for determining whether the text resolution is high or low, and may be arbitrarily set.

In operation S1040, when it is determined that the text resolution of the output screen is less than the first threshold value, the display apparatus 100 may determine that the protocol is non-suitable. For example, when it is determined that the protocol is non-suitable, the display apparatus 100 may perform an operation of changing the protocol. Also, for example, the display apparatus 100 may transmit a request for changing the protocol to the electronic device 200 as in operation S645 of FIG. 6. Also, for example, the display apparatus 100 may provide a user interface for asking whether to change the protocol as in operation S960 of FIG. 9. In some embodiments, for example, the display apparatus 100 may automatically change the protocol, an example of which is described below in operation S1360 of FIG. 13.

However, when it is determined that the text resolution of the output screen is equal to or greater than the first threshold value, the display apparatus 100 may output the content received from the electronic device 200 through the first protocol in operation S1010.

Referring to FIG. 10B, in operation S1110, the display apparatus 100 may output the content received through the remote connection with the electronic device 200. The display apparatus 100 may receive data through the first protocol or the second protocol.

In operation S1120, the display apparatus 100 may determine the amount of change of an image of an output screen, based on current receiving of content through the second protocol.

For example, when the display apparatus 100 determines that the content is received through the second protocol, the display apparatus 100 may determine whether the second protocol is suitable for receiving the content. For example, when the display apparatus 100 determines that the content is input to a pipeline corresponding to the second protocol, the display apparatus 100 may determine that the content is currently received through the second protocol. For example, when the display apparatus 100 determines that data is input to the remote desktop client module 102, the display apparatus 100 may determine that the data is received through the second protocol.

For example, the display apparatus 100 may receive the data through the remote desktop protocol, and in this case, when the received content is document content, the remote desktop protocol may be a suitable protocol, because text data may have to be transmitted without loss. However, when the content received by the display apparatus 100 is video content, a large volume of data may be received without compression, and thus, the amount of change of an output screen may be increased, and a latency of the playback of the video may be increased. Thus, when the content received by the display apparatus 100 is the video content, the streaming protocol, rather than the remote desktop protocol, may be a suitable protocol. Thus, based on the determining that the data is received through the second protocol, the display apparatus 100 may determine whether the amount of change of an image of the video content is large.

For example, the display apparatus 100 may periodically determine the amount of change of an image of the output screen of the content.

In operation S1130, the display apparatus 100 may determine whether the amount of change of the image of the output screen is greater than a second threshold value.

For example, the display apparatus 100 may perform various operations for determining the amount of change of the image of the output screen. For example, the display apparatus 100 may calculate a difference image between frames of the output screen. The difference image may indicate a difference between a first frame and a second frame. An example of aspect is described in detail below with reference to FIG. 12.

In operation S1140, when it is determined that the amount of change of the image of the output screen is greater than the second threshold value, the display apparatus 100 may determine that the protocol is non-suitable. For example, when it is determined that the protocol is non-suitable, the display apparatus 100 may perform an operation of changing the protocol. Also, for example, the display apparatus 100 may transmit a request for changing the protocol to the electronic device 200 as in operation S645 of FIG. 6. Also, for example, the display apparatus 100 may provide a user interface for asking whether to change the protocol as in operation S960 of FIG. 9. Alternatively, for example, the display apparatus 100 may automatically change the protocol as in operation S1360 of FIG. 13.

However, when it is determined that the amount of change of the image of the output screen is the second threshold value or less, the display apparatus 100 may output the content received from the electronic device 200 through the second protocol in operation S1110.

Figure 11:
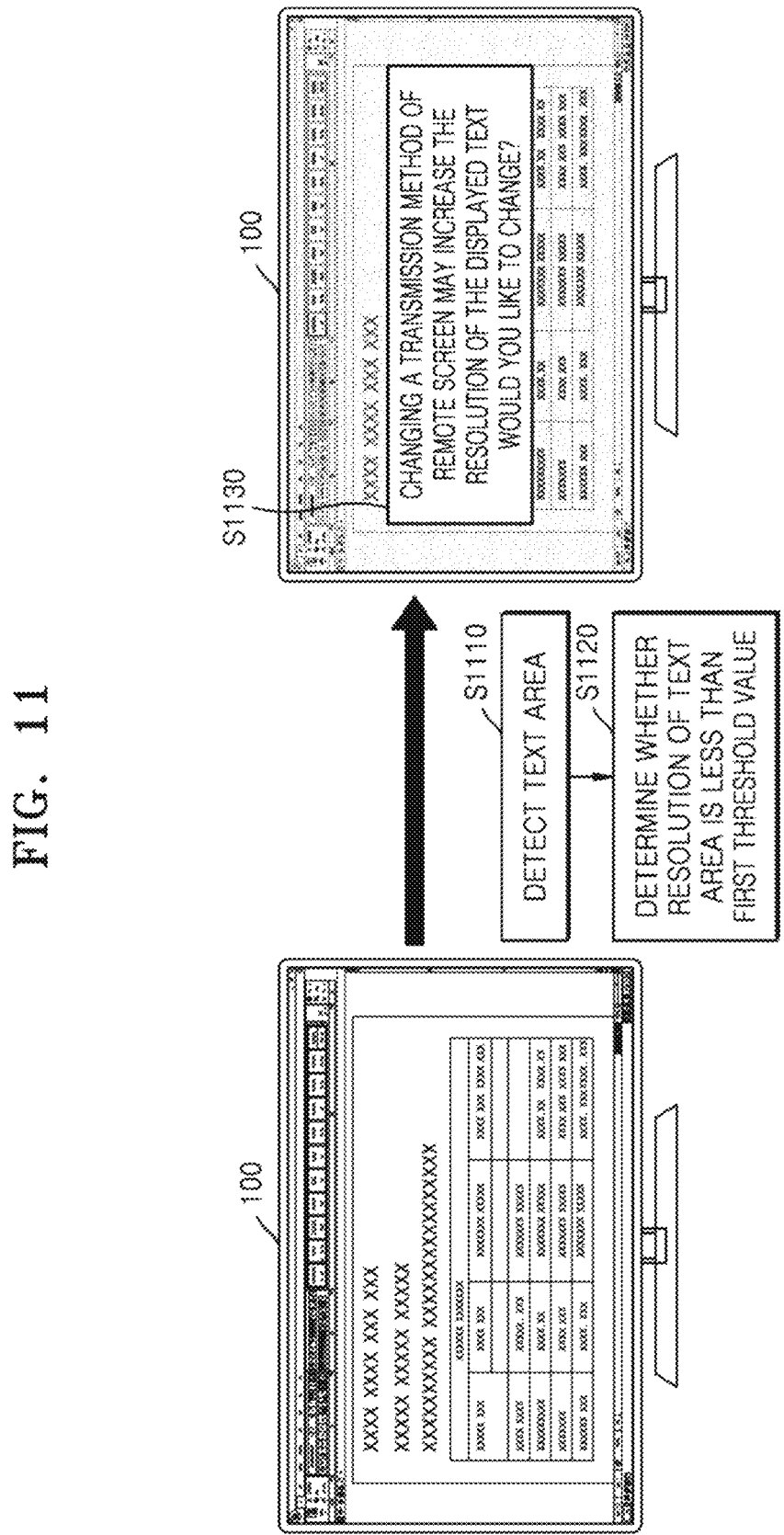
FIG. 11 is an example diagram for describing a first protocol suitability determination operation of a display apparatus, according to an embodiment of the disclosure.

FIG. 11 is an example diagram for describing a first protocol suitability determination operation of a display apparatus, according to an embodiment of the disclosure.

In operation S1110, the display apparatus 100 may detect a text area of an output screen. For example, the display apparatus 100 may detect the text area of the output screen using a text detection technique. In operation S1120, the display apparatus 100 may determine whether a resolution of the text area is less than a first threshold value. For example, the display apparatus 100 may determine the resolution of the text area according to an image processing algorithm or may determine noise of the text area according to a PSNR process. In some embodiments, for example, the display apparatus 100 may determine the resolution of the text area using a text clarity model. Here, the first threshold value may be a reference value for determining whether the text resolution is high or low and may be arbitrarily set.

However, the operation of determining the suitability of the first protocol illustrated in FIG. 11 is only an example, and the suitability may be determined by various methods.

In operation S1130, the display apparatus 100 may provide a user interface for asking whether to change the protocol, based on determining that the resolution of the text area is less than the first threshold value. For example, the display apparatus 100 may provide a user interface displaying that "Changing a transmission method of the remote screen may increase the resolution of displayed text. Would you like to change?"

For example, the display apparatus 100 may change the protocol, based on receiving of a user input for agreeing to change. According to an embodiment of the disclosure, when a user does not input any selection, the display apparatus 100 may set not to change the protocol as a default.

Figure 12:
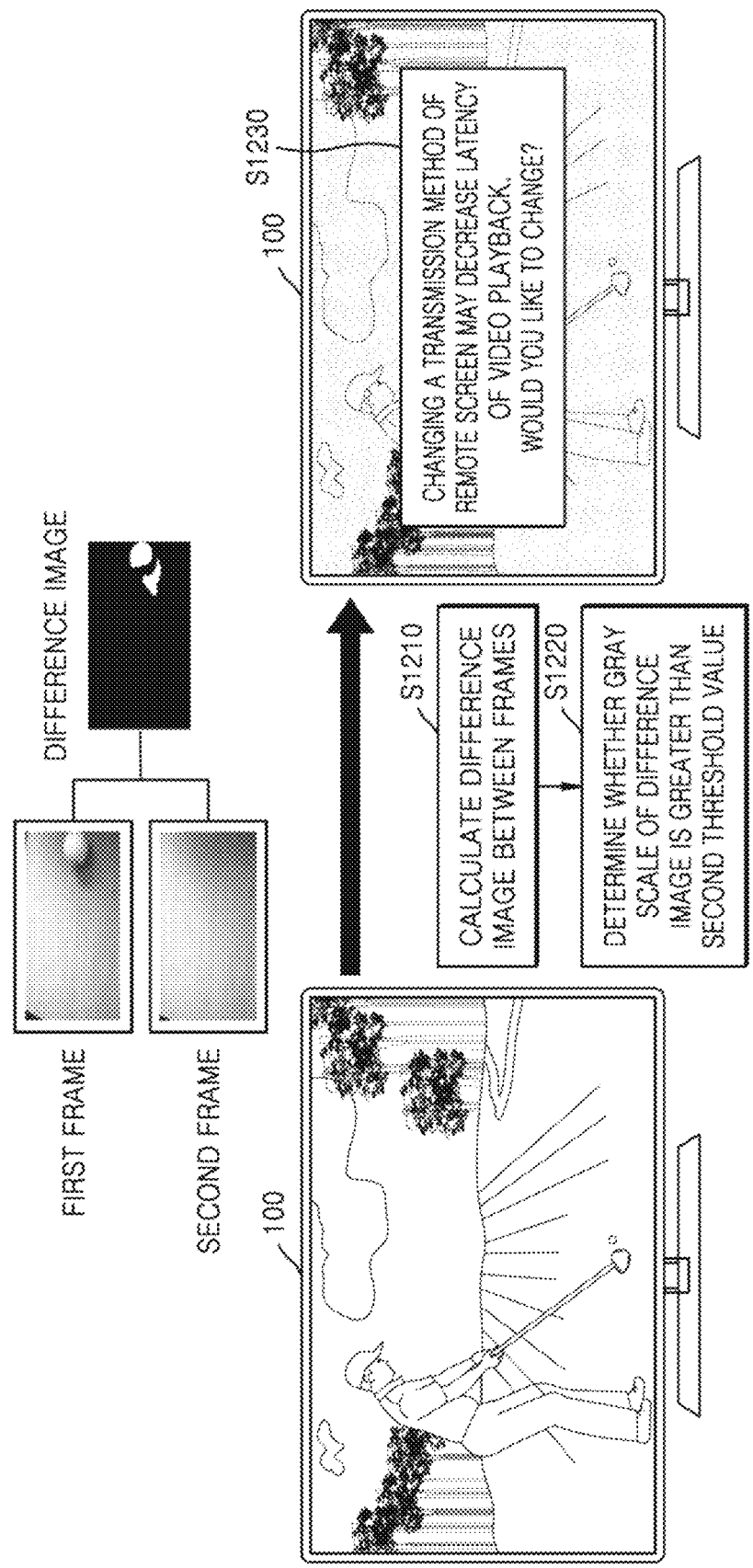
FIG. 12 is an example diagram for describing a second protocol suitability determination operation of a display apparatus, according to an embodiment of the disclosure.

FIG. 12 is an example diagram for describing a second protocol suitability determination operation of a display apparatus, according to an embodiment of the disclosure.

In operation S1210, the display apparatus 100 may calculate a difference image between frames of an output screen. The difference image may indicate a difference between a first frame and a second frame.

In operation S1220, the display apparatus 100 may determine whether a gray scale of the difference image is greater than a second threshold value. For example, the difference image between the first frame and the second frame indicates the amount of change of an image between the first frame and the second frame in the gray scale, and thus, when the gray scale of the difference image is greater than the second threshold value, it may be determined that the amount of change of the image is large. Here, the second threshold value may be a reference value for determining whether the amount of change of the image is large or small and may be arbitrarily set.

However, the operation of determining the suitability of the second protocol illustrated in FIG. 12 is only an example, and the suitability of the second protocol may be determined by various methods.

In operation S1230, the display apparatus 100 may provide a user interface for asking whether to change the protocol, based on determining that the amount of change of the image is greater than the second threshold value. For example, the display apparatus 100 may provide a user interface displaying that "Changing a transmission method of the remote screen may decrease latency of video playback. Would you like to change?"

For example, the display apparatus 100 may change the protocol, based on receiving of a user input for agreeing to change. According to an embodiment of the disclosure, when a user does not input any selection, the display apparatus 100 may set not to change the protocol as default.

Figure 13:
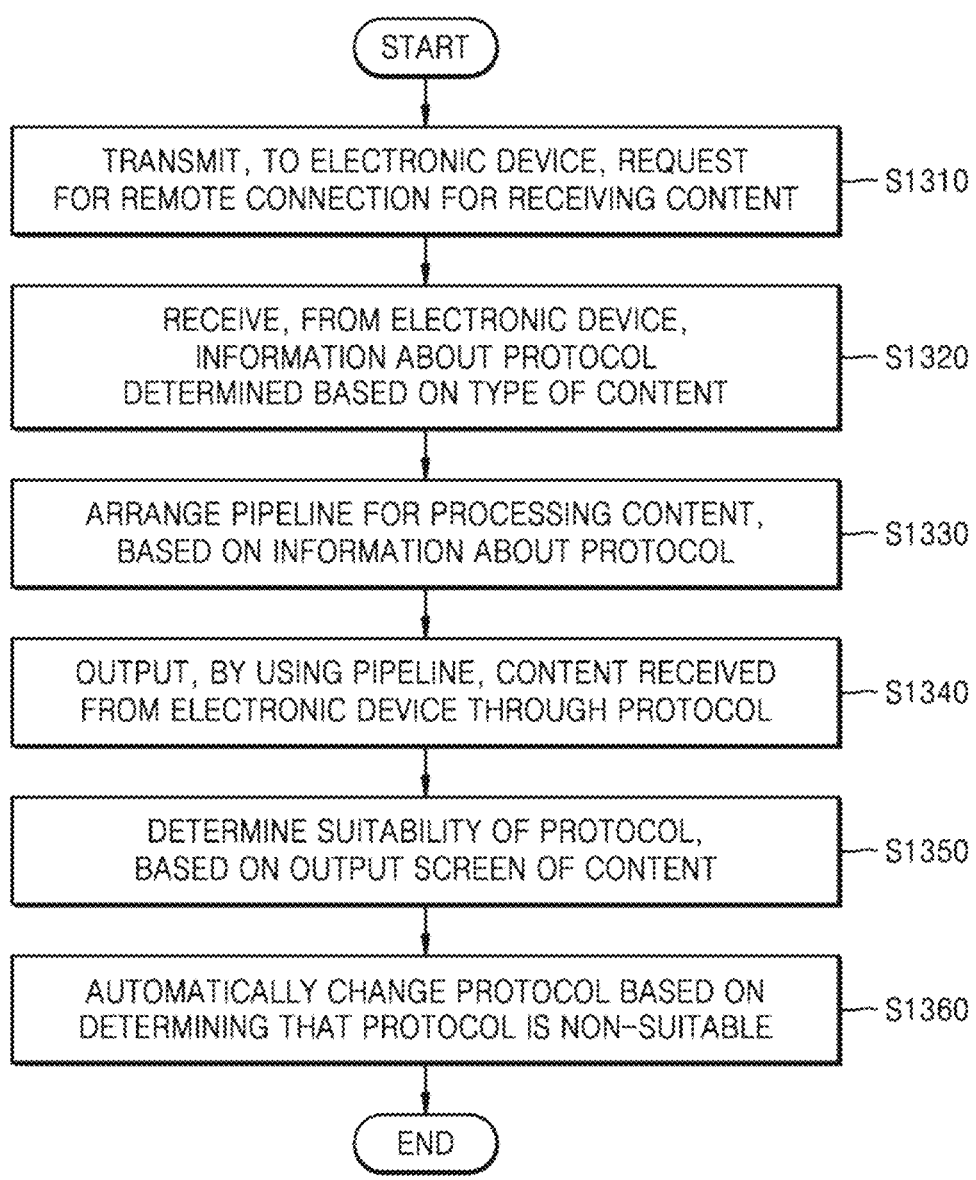
FIG. 13 is an example of a flowchart showing an operation of a display apparatus, according to an embodiment of the disclosure.

FIG. 13 is an example of a flowchart showing an operation of a display apparatus, according to an embodiment of the disclosure.

According to an embodiment of the disclosure, the example illustrated in FIG. 13 may differ from of the example illustrated in FIG. 9 in that, in when it is determined in the example of FIG. 13 that a current protocol is non-suitable, the display apparatus 100 may automatically change the protocol without providing a user interface.

In operation S1310, the display apparatus 100 according to an embodiment of the disclosure may transmit a request for remote connection for receiving content, to the electronic device 200. According to an embodiment of the disclosure, operation S1310 may correspond to operation S910 of FIG. 9.

In operation S1320, the display apparatus 100 according to an embodiment of the disclosure may receive information about a protocol determined based on a type of content from the electronic device 200. According to an embodiment of the disclosure, operation S1320 may correspond to operation S920 of FIG. 9.

In operation S1330, the display apparatus 100 according to an embodiment of the disclosure may arrange a pipeline for processing the content, based on the information about the protocol. According to an embodiment of the disclosure, operation S1330 may correspond to operation S930 of FIG. 9.

In operation S1340, the display apparatus 100 according to an embodiment of the disclosure may output, using the pipeline, the content received from the electronic device 200 through the protocol. According to an embodiment of the disclosure, operation S1340 may correspond to operation S940 of FIG. 9.

In operation S1350, the display apparatus 100 according to an embodiment of the disclosure may determine the suitability of the protocol, based on an output screen of the content. According to an embodiment of the disclosure, operation S1350 may correspond to operation S950 of FIG. 9.

In operation S1360, based on determining that the protocol is non-suitable, the display apparatus 100 according to an embodiment of the disclosure may automatically change the protocol. For example, the display apparatus 100 may change the protocol without asking a user. The display apparatus 100 may transmit a request for changing the protocol to the electronic device 200.

Figure 14:
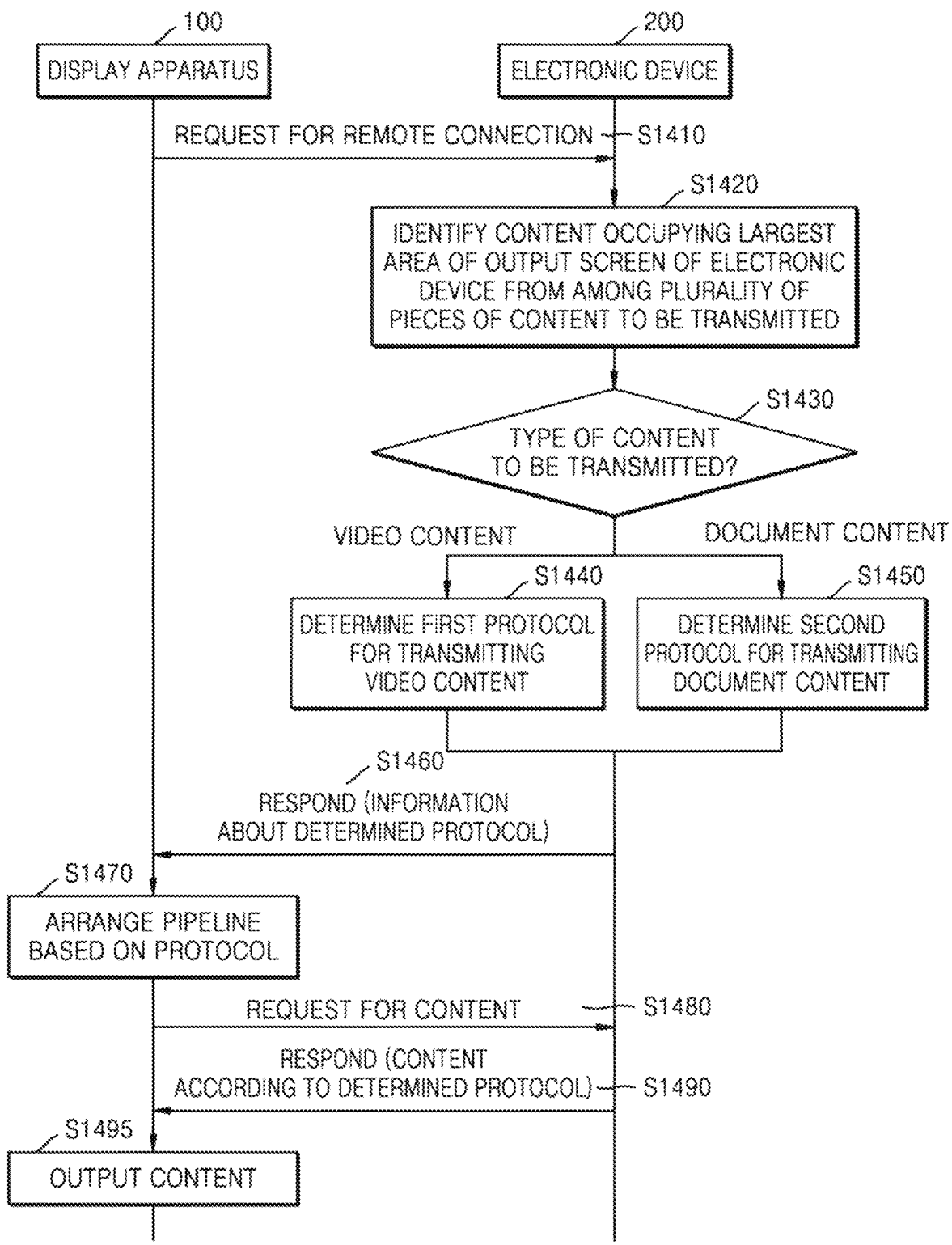
FIG. 14 is an example of a flowchart showing an operation of starting remote connection in a display apparatus and an electronic device, according to an embodiment of the disclosure.

FIG. 14 is an example of a flowchart showing an operation of starting remote connection in a display apparatus and an electronic device, according to an embodiment of the disclosure. FIG. 14 is an example of a detailed flowchart of the operation 601 of starting the remote connection in FIG. 6. In the description of FIG. 14, aspects which are the same as aspects of FIG. 6 are briefly described.

In operation S1410, the display apparatus 100 may transmit a request for remote connection to the electronic device 200. According to an embodiment of the disclosure, operation S1410 may correspond to operation S605 of FIG. 6.

In operation S1420, the electronic device 200 may identify content having a largest area on an output screen of the electronic device 200 from among a plurality of pieces of content to be transmitted. For example, the electronic device 200 may output a single-view screen providing one piece of content. However, the electronic device 200 may also output a multi-view screen simultaneously providing a plurality of pieces of content. For example, when the electronic device 200 identifies content to be transmitted, a plurality of pieces of content may be mixed in a single output screen of the electronic device 200. For example, the single output screen of the electronic device 200 may be split in two windows and executed. In this case, the electronic device 200 may identify a type of the content, based on a largest view having a largest area of the output screen of the electronic device 200 from among the plurality of pieces of content. In operation S1430, the electronic device 200 may identify the type of the content to be transmitted.

In operation S1440, when it is determined that the type of the content to be transmitted is video content, the electronic device 200 may determine a first protocol as a transmission protocol to transmit the video content.

In operation S1450, when it is determined that the type of the content to be transmitted is document content, the electronic device 200 may determine a second protocol as a transmission protocol to transmit the document content.

For example, when the electronic device 200 outputs the video content and the document content on the multi-view screen, the electronic device 200 may identify the type of content having a larger area between the video content and the document content and determine a protocol that is suitable according to the identified type of content.

Here, when different types of content displayed on the output screen of the electronic device 200 occupy similar sized areas, a predetermined default protocol may be determined. For example, when it is determined that the performance of minimizing the latency of the video content is important in the remote connection service, the default protocol of the electronic device 200 may be the first protocol. In some embodiments, for example, when it is determined that the performance for maximizing the text visibility is important in the remote connection service, the default protocol of the electronic device 200 may be the second protocol.

In operation S1460, the electronic device 200 may respond to the display apparatus 100 by transmitting information about the determined protocol to the display apparatus 100, in response to receiving the request for remote connection from the display apparatus 100.

In operation S1470, the display apparatus 100 may arrange a pipeline based on the protocol, based on the information about the protocol received form the electronic device 200. For example, based on the information about the protocol received from the electronic device 200, the display apparatus 100 may determine the protocol and may arrange the pipeline according to the determined protocol.

In operation S1480, the display apparatus 100 may transmit a request for content to the electronic device 200.

In operation S1490, the electronic device 200 may respond to the display apparatus 100 by transmitting the content according to the determined protocol, in response to receiving of the request for the content from the display apparatus 100.

In operation S1495, the display apparatus 100 may output the content received from the electronic device 200.

Figure 15:
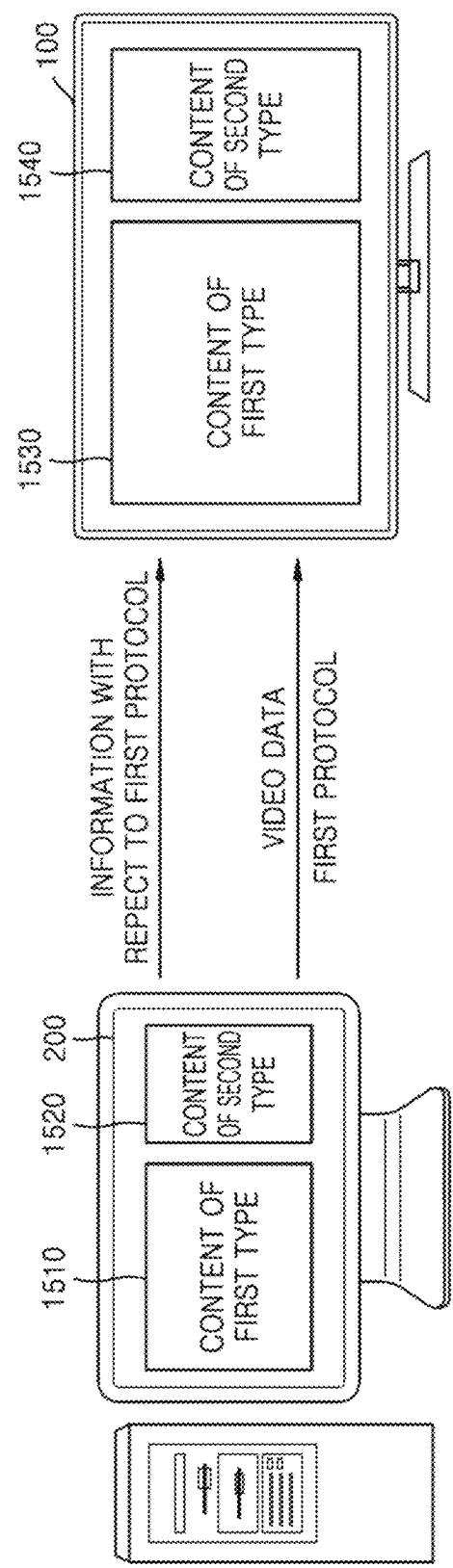
FIG. 15 is an example diagram for describing operations of an electronic device configured to output a plurality of pieces of content and a display apparatus remotely connected to the electronic device, according to an embodiment of the disclosure.

FIG. 15 is an example diagram for describing operations of an electronic device configured to output a plurality of pieces of content and a display apparatus remotely connected to the electronic device, according to an embodiment of the disclosure.

Referring to FIG. 15, the electronic device 200 may output a multi-view screen simultaneously providing the plurality of pieces of content. For example, the electronic device 200 may simultaneously execute content 1510 of a first type and content 1520 of a second type. For example, an output screen of the content 1510 of the first type may have a larger area than an output screen of the content 1520 of the second type.

For example, the electronic device 200 may identify a type of content based on the screen of the content 1510 of the first type having the largest area on the output screen. For example, the electronic device 200 may determine a first protocol suitable to transmit the content 1510 of the first type, as a transmission protocol. For example, the electronic device 200 may transmit information about the first protocol to the display apparatus 100. The display apparatus 100 may arrange a pipeline based on the first protocol, based on receiving of the information about the first protocol. The electronic device 200 may transmit, through the first protocol, compressed video data corresponding to the content 1510 of the first type, to the display apparatus 100. The display apparatus 100 may output the video data on a display by decompressing the compressed video data received through the first protocol. The display apparatus 100 may receive content 1530 of a first type and content 1540 of a second type through the first protocol and may simultaneously output the content 1530 of the first type and the content 1540 of the second type.

Figure 16:
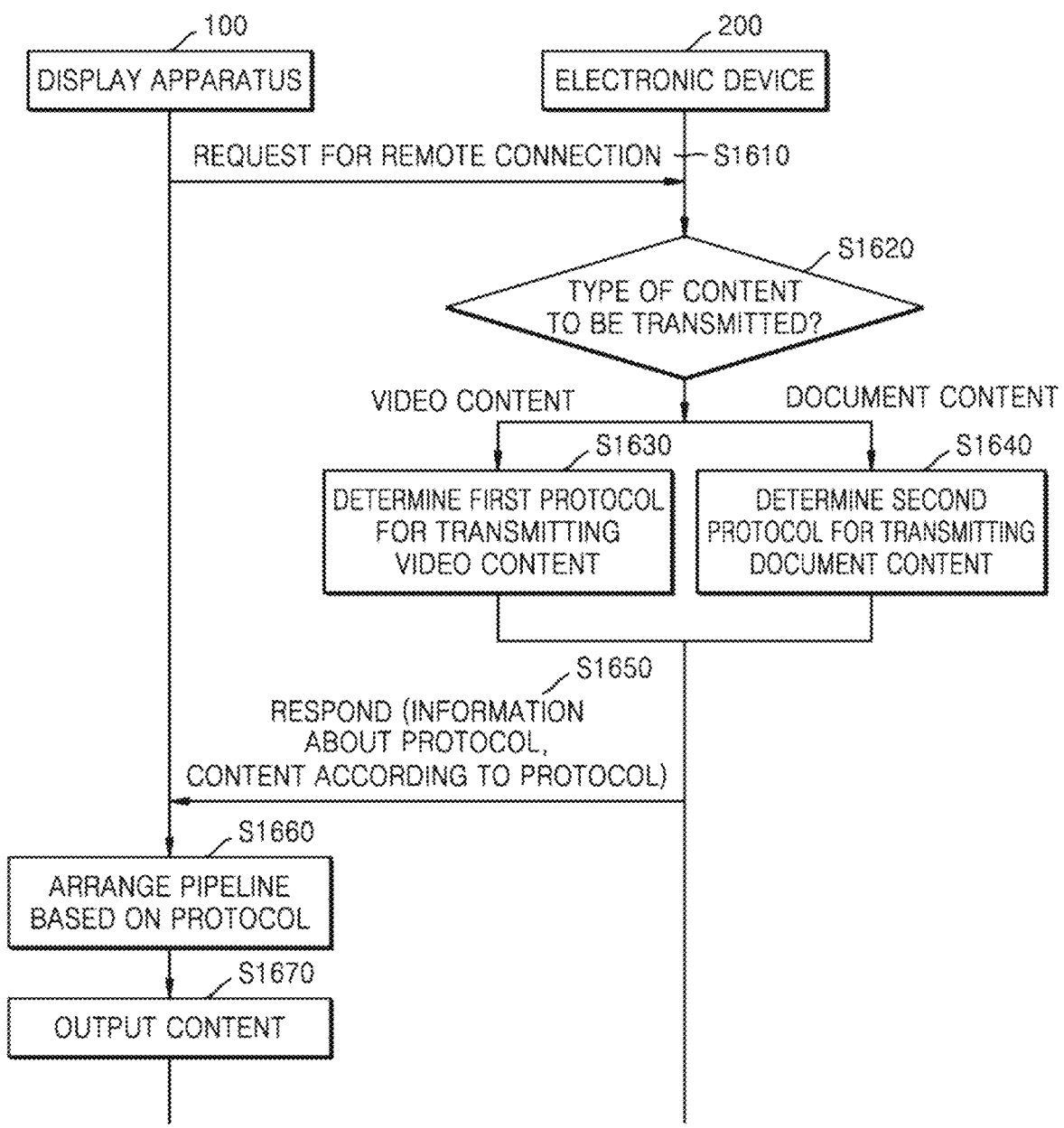
FIG. 16 is an example of a flowchart showing an operation of starting remote connection in a display apparatus and an electronic device, according to an embodiment of the disclosure.

FIG. 16 is an example of a flowchart showing an operation of starting remote connection in a display apparatus and an electronic device, according to an embodiment of the disclosure. FIG. 16 is an example of a detailed flowchart of the operation 601 of starting the remote connection in FIG. 6. In the description of FIG. 16, aspects which are the same as aspects of FIG. 6 are briefly described.

In operation S1610, the display apparatus 100 may transmit a request for remote connection to the electronic device 200.

In operation S1620, the electronic device 200 may identify a type of content to be transmitted. For example, the electronic device 200 may identify whether the type of the content to be transmitted is video content or document content through metadata of the content to be transmitted.

In operation S1630, when it is determined that the type of the content to be transmitted is the video content, the electronic device 200 may determine a transmission protocol to transmit the video content as a first protocol.

In operation S1640, when it is determined that the type of the content to be transmitted is the document content, the electronic device 200 may determine a transmission protocol to transmit the document content as a second protocol.

In operation S1650, the electronic device 200 may respond to the display apparatus 100 by transmitting information about the selected protocol and the content through the protocol to the display apparatus 100, in response to receiving the request for remote connection from the display apparatus 100. For example, the electronic device 200 may sequentially or simultaneously perform operations S615 and S630 of FIG. 6.

For example, the electronic device 200 may transmit the content through the protocol to the display apparatus 100, before the display apparatus 100 selects the protocol and the electronic device 200 receives a request for content from the display apparatus 100.

In operation S1660, the display apparatus 100 may determine the protocol, arrange a pipeline, and receive the content, based on receiving of the information about the protocol and the content through the protocol from the electronic device 200.

In operation S1670, the display apparatus 100 may output the content, based on the content received from the electronic device 200.

Figure 17:
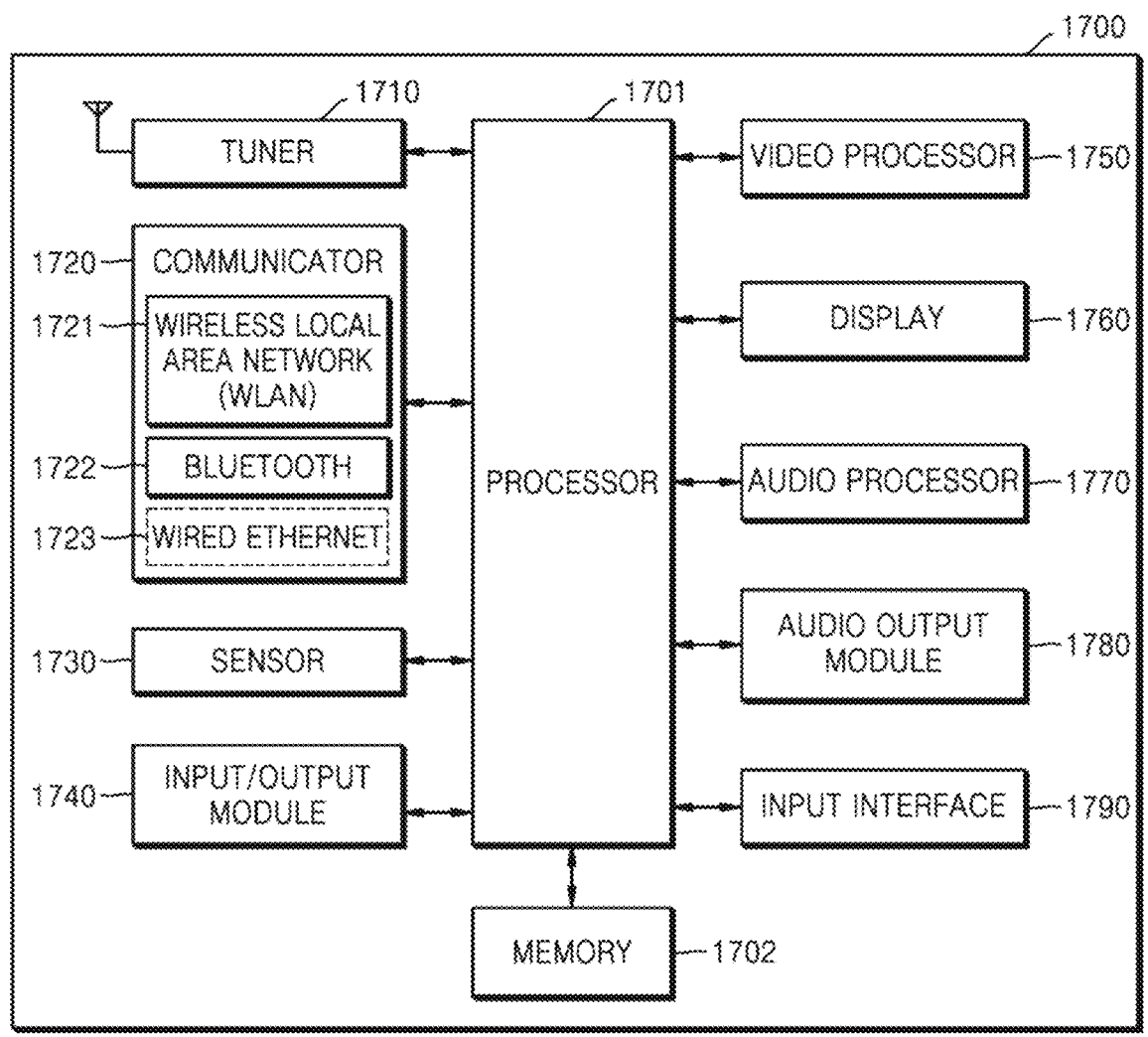
FIG. 17 is a block diagram showing a structure of a display apparatus according to an embodiment of the disclosure.

FIG. 17 is a detailed block diagram showing a structure of a display apparatus according to an embodiment of the disclosure.

A display apparatus 1700 of FIG. 17 may be an example of the display apparatus 100 of FIG. 2. Hereinafter, the duplicative or redundant description of some aspects which are similar to aspects described with reference to FIG. 2 are omitted.

Referring to FIG. 17, the display apparatus 1700 may include a processor 1701 and a memory 1702. The processor 1701 and the memory 1702 included in the display apparatus 1700 may perform the same operations as the processor 110 and the memory 140 included in the display apparatus 100 of FIG. 2.

According to an embodiment of the disclosure, in addition to the processor 1701 and the memory 1702, the display apparatus 1700 may further include a tuner 1710, a communicator 1720, a sensor 1730, an input/output module 1740, a video processor 1750, a display 1760, an audio processor 1770, an audio output module 1780, and an input interface 1790. The communicator 1720 may correspond to the communicator 120 of FIG. 2. The display 1760 may correspond to the display 130 of FIG. 2. The tuner 1710 may tune and select only a frequency of a channel to be received by the display apparatus 1700 from among many electro-wave components, through amplification, mixing, resonance, etc. about the broadcasting content, etc. received in a wired or wireless manner. The content received through the tuner 1710 may be decoded and may be divided into audio, video, and/or additional data. The divided audio, video, and/or additional data may be stored in the memory 1702 according to control by the processor 1701.

According to an embodiment of the disclosure, the communicator 1720 may connect the display apparatus 1700 to a peripheral device, an external device, a server, a mobile terminal, etc. according to control by the processor 1701. The communicator 1720 may include at least one communication module configured to perform wireless communication. The communicator 1720 may include at least one of a WLAN module 1721, a Bluetooth module 1722, or wired Ethernet 1723, according to the performance and structure of the display apparatus 1700.

The WLAN module 1721 may transmit and receive a WiFi signal to and from a peripheral device according to the WiFi communication standards. The Bluetooth module 1722 may receive a Bluetooth signal transmitted from the peripheral device according to the Bluetooth communication standards. The Bluetooth module 1722 may correspond to a BLE communication module and may receive a BLE signal. The Bluetooth module 1722 may constantly or temporarily scan the BLE signal in order to sense whether the BLE signal is received.

The sensor 1730 may sense a voice of a user, an image of the user, or an interaction of the user and may include a microphone, a camera, a light receiver, and a sensing portion.

The input/output module 1740 may receive video (for example, a motion image signal, a still image signal, etc.), audio (for example, a voice signal, a music signal, etc.), and additional information from an external device, etc. according to control by the processor 1701. The input/output module 1740 may include one of a high-definition multimedia interface (HDMI) port, a component jack, a PC port, and a universal serial bus (USB) port.

The video processor 1750 may process video data to be displayed on the display 1760 and may perform, on the video data, various image processing operations, such as decoding, rendering, scaling, noise removal, frame rate conversion, resolution conversion, etc. For example, the video processor 1750 may include a media codec for processing video content. For example, the video processor 1750 may include the streaming processing module 101 of FIG. 7. The remote desktop client module 102 of FIG. 7 may be realized as software or hardware, may process graphics data to be displayed by the display 1760, and may perform various image processing operations.

The display 1760 may output, on a screen, content received from a broadcasting station or received from an external device, such as an external server or an external storage medium, or provided by various applications, for example, an OTT service provider or a metaverse content provider. The display 1760 may display content received from the electronic device 200 and image-processed.

The audio processor 1770 may process audio data. The audio processor 1770 may perform, on the audio data, various processing operations, such as decoding, amplification, noise removal, etc.

The audio output module 1780 may output audio included in content received through the tuner 1710, audio which is input through the communicator 1720 or the input/output module 1740, and audio stored in the memory 1702, according to control by the processor 1701. The audio output module 1780 may include at least one of a speaker, a headphone, or a Sony/Philips digital interface (S/PDIF) output terminal.

The input interface 1790 may receive a user input for controlling the display apparatus 1700. The input interface 1790 may include, but is not limited to, various types of user input devices including a touch panel configured to sense a user's touch, a button configured to receive user's push manipulation, a wheel configured to receive user's rotation manipulation, a keyboard, a dome switch, a microphone configured to recognize a sound, a motion sensor configured to sense a motion, and the like.

Machine-readable storage media may be provided as non-transitory storage media. Here, the term "non-transitory storage media" only denotes that the media are tangible devices and do not include signals (e.g., electromagnetic waves), and does not distinguish the storage media semi-permanently storing data and the storage media temporarily storing data. For example, the "non-transitory storage media" may include a buffer temporarily storing data.

According to an embodiment of the disclosure, the method according to an embodiment of the disclosure provided in the present specification may be provided as an inclusion of a computer program product. The computer program product may be, as a product, transacted between a seller and a purchaser. The computer program product may be distributed in the form of a machine-readable storage medium (e.g., a compact disc (CD)-ROM) or may be distributed online (e.g., downloaded or uploaded) through an application store or directly between two user devices (e.g., smartphones). In the case of online distribution, at least part of a computer program product (e.g., a downloadable application) may be at least temporarily stored in a machine-readable storage medium, such as a server of a manufacturer, a server of an application store, or a memory of a relay server, or may be temporarily generated.

What is claimed is:

1. A display apparatus comprising:
   a display;
   a communicator;
   at least one processor; and
   a memory configured to store one or more instructions which, when executed by the at least one processor, cause the display apparatus to:
   transmit, to an electronic device, a request for remote connection for receiving content;
   receive, from the electronic device, information about a protocol determined based on a type of the content;
   arrange a pipeline configured to process the content, based on the information about the protocol; and
   output, using the pipeline, the content received from the electronic device according to the protocol.

2. The display apparatus of claim 1, wherein the one or more instructions further cause the display apparatus to:
   determine whether to change the protocol, based on an output screen corresponding to the content; and
   based on determining to change the protocol, transmit a request for changing the protocol to the electronic device.

3. The display apparatus of claim 1, the one or more instructions further cause the display apparatus to:
   receive content of a first type according to a first protocol, based on the information about the protocol received from the electronic device indicating the first protocol; and
   receive content of a second type according to a second protocol different from the first protocol, based on the information about the protocol indicating the second protocol.

4. The display apparatus of claim 3, wherein the content of the first type comprises video content, and the content of the second type comprises document content.

5. The display apparatus of claim 3, wherein the one or more instructions further cause the display apparatus to:
   arrange a first pipeline comprising a decoder, based on the information about the protocol receiving from the electronic device indicating the first protocol; and arrange a second pipeline which does not include the decoder, based on the information about the second protocol received from the electronic device indicating the second protocol.

6. The display apparatus of claim 3, wherein the one or more instructions further cause the display apparatus to:
determine, using a first process, a state of an output screen based on the content being received according to the first protocol; and
determine, using a second process different from the first process, the state of the output screen based on the content being received according to the second protocol.

7. The display apparatus of claim 3, wherein the one or more instructions further cause the display apparatus to:
determine a text resolution of the content received from the electronic device according to the first protocol; and
transmit, to the electronic device, a request for changing to the second protocol, based on determining that the text resolution is less than a threshold value.

8. The display apparatus of claim 3, wherein the one or more instructions further cause the display apparatus to:
determine an amount of change of an image of the content received from the electronic device according to the second protocol; and
transmit, to the electronic device, a request for changing to the first protocol, based on determining that the amount of change of the image is greater than a threshold value.

9. The display apparatus of claim 1, wherein the one or more instructions further cause the display apparatus to:
receive, from the electronic device, the information about the protocol based on a type of a piece of content having a largest area on an output screen of the electronic device from among a plurality of pieces of content.

10. The display apparatus of claim 1, wherein the one or more instructions further cause the display apparatus to:
provide a user interface for asking whether to change the protocol, based on determining that the determined protocol of the display apparatus is non-suitable.

11. The display apparatus of claim 1, wherein the one or more instructions further cause the display apparatus to:
process, using the pipeline, image data received from the electronic device through a remote desktop protocol; and
playback, using the pipeline, video data received from the electronic device through a streaming protocol.

12. An electronic device comprising:
a communicator;
at least one processor; and
a memory configured to store one or more instructions which, when executed by the at least one processor, cause the electronic device to:
receive a request for remote connection from a display apparatus;
determine a protocol based on a type of content to be transmitted to the display apparatus;
transmit information about the determined protocol to the display apparatus; and
based on receiving a request for the content from the display apparatus, transmit the content to the display apparatus according to the protocol.

13. The electronic device of claim 12, wherein the one or more instructions further cause the electronic device to change the protocol based on receiving a request for changing the protocol from the display apparatus.

14. The electronic device of claim 12, wherein the one or more instructions further cause the electronic device to:
transmit information about a first protocol to the display apparatus, based on determining that the content is content of a first type; and
transmit information about a second protocol different from the first protocol to the display apparatus, based on determining that the content is content of a second type.

15. The electronic device of claim 14, wherein the content of the first type comprises video content, and the content of the second type comprises document content.

16. The electronic device of claim 12, wherein the one or more instructions further cause the electronic device to:
identify a piece of content having a largest area on an output screen of the electronic device from among a plurality of pieces of content to be transmitted; and
transmit the information about the protocol corresponding to a type of the identified piece of content.

17. An operating method of a display apparatus, the operating method comprising:
transmitting, to an electronic device, a request for remote connection for receiving content;
receiving, from the electronic device, information about a protocol determined based on a type of the content;
arranging a pipeline for processing the content, based on the information about the protocol; and
outputting, using the pipeline, the content received from the electronic device according to the protocol.

18. The operating method of claim 17, further comprising:
determining whether to change the protocol, based on an output screen corresponding to the content; and
based on determining to change the protocol, transmitting, to the electronic device, a request for changing the protocol.

19. The operating method of claim 17, wherein the receiving, from the electronic device, of the information about the protocol determined based on the type of the content comprises:
receiving content of a first type according to a first protocol, based on the information about the protocol received from the electronic device indicating the first protocol; and
receiving content of a second type according to a second protocol different from the first protocol, based on the information about the protocol received from the electronic device indicating the second protocol.

20. The operating method of claim 19, wherein the arranging of the pipeline for processing the content, based on the information about the protocol, comprises:
arranging a first pipeline comprising a decoder, based the information about the protocol received from the electronic device indicating the first protocol; and
arranging a second pipeline not including the decoder, based on the information about the protocol received from the electronic device indicating the second protocol.

* * * * *